US009696494B2

(12) United States Patent
Facer

(10) Patent No.: US 9,696,494 B2
(45) Date of Patent: Jul. 4, 2017

(54) ALIGNING GUIDE USING PRESSURE-SENSITIVE INDEX CHANGE ELASTOMER

(71) Applicant: EMPIRE TECHNOLOGY DEVELOPMENT LLC, Wilmington, DE (US)

(72) Inventor: Geoffrey Richard Facer, Belmont, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/112,151

(22) PCT Filed: Jan. 17, 2014

(86) PCT No.: PCT/US2014/012042
§ 371 (c)(1),
(2) Date: Jul. 15, 2016

(87) PCT Pub. No.: WO2015/108531
PCT Pub. Date: Jul. 23, 2015

(65) Prior Publication Data
US 2016/0334581 A1 Nov. 17, 2016

(51) Int. Cl.
*G02B 6/26* (2006.01)
*G02F 1/01* (2006.01)
*G02B 6/255* (2006.01)

(52) U.S. Cl.
CPC ........... *G02B 6/264* (2013.01); *G02F 1/0134* (2013.01); *G02B 6/2555* (2013.01)

(58) Field of Classification Search
CPC .............................. G02F 1/0134; G02B 6/264
See application file for complete search history.

(56) References Cited

U.S. PATENT DOCUMENTS 4,056,305 A 11/1977 McCartney et al.
4,428,234 A 1/1984 Walker
(Continued)

FOREIGN PATENT DOCUMENTS

CN 101430449 A 5/2009
CN 101952794 A 1/2011
(Continued)

OTHER PUBLICATIONS

"Fresnel equations," Wikipedia, accessed at http://web.archive.org/web/20131207002749/http://en.wikipedia.org/wiki/Fresnel_equations, last modified on Oct. 26, 2013, pp. 4.
(Continued)

*Primary Examiner* — Jerry Rahll
(74) *Attorney, Agent, or Firm* — Maschoff Brennan

(57) ABSTRACT

An optical interconnect can be located between a first optical guide with a first optical guide end and a second optical guide with a second optical guide end. The first optical guide and the second optical guide can each have an operational wavelength, which can be substantially the same such that light of such a wavelength can propagate through the optical interconnect. The optical interconnect can include a pressure-sensitive material with a first region with a first refractive index at the operating wavelength. The pressure-sensitive material can include a second region with a second refractive index at the operating wavelength located between the first optical guide end and the second optical guide end. The second region can be induced by a mechanical pressure applied between the first guide end and the second guide end.

25 Claims, 10 Drawing Sheets

(56) References Cited

U.S. PATENT DOCUMENTS

| | | | |
|---|---|---|---|
| 4,480,182 A | 10/1984 | Ely et al. | |
| 4,542,375 A | 9/1985 | Alles et al. | |
| 4,609,816 A | 9/1986 | Severin | |
| 4,634,858 A | 1/1987 | Gerdt et al. | |
| 4,662,962 A | 5/1987 | Malavieille | |
| 4,685,765 A | 8/1987 | Daly et al. | |
| 4,733,068 A | 3/1988 | Thiele et al. | |
| 4,886,361 A | 12/1989 | Fürstenau | |
| 4,929,050 A | 5/1990 | Wilson | |
| 5,136,666 A | 8/1992 | Anderson et al. | |
| 5,555,331 A | 9/1996 | Billet et al. | |
| 5,835,646 A | 11/1998 | Yoshimura et al. | |
| 6,081,632 A | 6/2000 | Yoshimura et al. | |
| 6,231,593 B1 | 5/2001 | Meserol | |
| 6,236,782 B1 | 5/2001 | Kewitsch et al. | |
| 6,278,815 B1 | 8/2001 | Poisel | |
| 6,398,778 B1 | 6/2002 | Gu et al. | |
| 6,492,980 B2 | 12/2002 | Sandbach | |
| 6,538,644 B1 | 3/2003 | Muraoka | |
| 6,763,154 B2 | 7/2004 | MacDonald et al. | |
| 6,842,545 B2 | 1/2005 | Lackritz et al. | |
| 8,526,770 B2 | 9/2013 | Casasanta | |
| 2002/0181908 A1 | 12/2002 | Pedersen et al. | |
| 2002/0186945 A1 | 12/2002 | Szkopek et al. | |
| 2002/0196995 A1 | 12/2002 | Kersey et al. | |
| 2003/0026554 A1 | 2/2003 | Jin et al. | |
| 2004/0067005 A1 | 4/2004 | Miyazawa et al. | |
| 2004/0242841 A1 | 12/2004 | Cammack et al. | |
| 2005/0017383 A1 | 1/2005 | Shimizu et al. | |
| 2005/0052714 A1 | 3/2005 | Klug et al. | |
| 2005/0201681 A1 | 9/2005 | Payne | |
| 2005/0286835 A1 | 12/2005 | Maxey | |
| 2006/0001653 A1 | 1/2006 | Smits | |
| 2006/0023988 A1 | 2/2006 | Kurtz et al. | |
| 2007/0235297 A1 | 10/2007 | Stoschek et al. | |
| 2010/0156648 A1 | 6/2010 | Yatsuda et al. | |
| 2011/0102705 A1 | 5/2011 | Miyazaki et al. | |
| 2011/0114856 A1 | 5/2011 | Cooke | |
| 2012/0288227 A1 | 11/2012 | Kim et al. | |
| 2012/0315485 A1 | 12/2012 | Iwazumi et al. | |
| 2013/0089289 A1 | 4/2013 | Sorin et al. | |

FOREIGN PATENT DOCUMENTS

| | | | |
|---|---|---|---|
| EP | 1315006 A1 | 5/2003 | |
| EP | 2254030 A1 | 11/2010 | |
| JP | 5621279 A | 2/1981 | |
| JP | 2001147772 A | 5/2001 | |
| WO | 2006081633 A1 | 8/2006 | |
| WO | 2007128039 A1 | 11/2007 | |
| WO | 2009113330 A1 | 9/2009 | |

OTHER PUBLICATIONS

"Fusion Splicing of Fibers," accessed at http://web.archive.org/web/20131018024758/http://www.rp-photonics.com/fusion_splicing_of_fibers.html, accessed on Jun. 22, 2016, pp. 4.

"Fusion splicing," Wikipedia, accessed at https://web.archive.org/web/20140109072644/http://en.wikipedia.org/wiki/Fusion_splicing, last modified on Dec. 23, 2013, pp. 3.

Astin, A.D., "Finger force capability: measurement and prediction using anthropometric and myoelectric measures," Thesis submitted to the Faculty of the Virginia Polytechnic Institute and State University, pp. 1-103 (Dec. 16, 1999).

Blanche, P.—A., et al., "Holographic three-dimensional telepresence using large-area photorefractive polymer," Nature, vol. 468, No. 7320, pp. 80-83 (Nov. 2010).

Christenson, C.W., et al., "Complementary grating dynamics in photorefractive polymers with Alq3," SPIE Proceedings, vol. 7599, pp. 1-4 (Mar. 1, 2010).

Eralp, M., et al., "Variation of Bragg condition in low-glass-transition photorefractive polymers when recorded in reflection geometry," Optics Express, vol. 15, No. 18, pp. 11622-11628 (Sep. 3, 2007).

Filas, R.W., et al., "Index-matching elastomers for fiber optics," IEEE Transactions on Components, Hybrids, and Manufacturing Technology, vol. 13, Issue 1, pp. 133-136 (Mar. 1990).

Fuks-Janczarek, I., et al., "Large photoelastic effect in modified fullerenes," Journal of Modern Optics, vol. 50, Issue 8, pp. 1277-1283 (2003).

Ganesan, L.M., et al., "Piezo-optical and electro-optical behavior of nematic liquid crystals dispersed in a ferroelectric copolymer matrix," Journal of Physics D Applied Physics, vol. 43, No. 1, pp. 15401-15406 (2009).

Gondek, E., et al., "UV-operated pyrazoloquinoline piezooptical materials," Optical Materials, vol. 30, Issue 6, pp. 939-945 (Feb. 2008).

International search report and written opinion for International Application No. PCT/US2014/035353, mailed on Sep. 2, 2014.

International Search Report and Written Opinion for International Application No. PCT/US2012/023124, mailed on Mar. 16, 2012.

International Search Report and Written Opinion for International Application No. PCT/US2014/012042, mailed on May 8, 2014.

Kityk, I.V., et al., "Photoinduced effects in γ-glycine nanocrystallites embedded in polymer matrices," Optics Communications, vol. 284, pp. 1575-1577 (2011).

NØrstebØ, C.A., "Intelligent Textiles, Soft Products," pp. 1-14 (2007).

Qiu, X., "Patterned piezo—, pyro—, and ferroelectricity of poled polymer electrets," Journal of Applied Physics, vol. 108, No. 1, pp. 011101-1-011101-19 (2010).

Sandrock, M., et al. "A widely tunable refractive index in a nanolayered photonic material," Applied Physics Letters, vol. 84, No. 18, pp. 3621-3623 (May 3, 2004).

Tkaczyk, S., et al., UV-excited piezo-optical effects in oxide nanocrystals incorporated into PMMA matrices, Acta Materialia, vol. 56, pp. 5677-5684 (2008).

Yoshimura, T., et al., "Self-Organized Lightwave Network Based on Waveguide Films for Three-Dimensional Optical Wiring Within Boxes," Journal of Lightwave Technology, vol. 22, No. 9, pp. 2091-2100 (Sep. 2004).

James Hutchinson and David Ramli, "NBN Contractors Fail to Deliver," Financial Review, Apr. 2, 2013, Retrieved from <http://www.afr.com/p/technology/nbn_contractors_fail_to_deliver_V1Z0n1N80KvXhvWd8e45cL>.

ALIGNING GUIDE USING PRESSURE-SENSITIVE INDEX CHANGE ELASTOMER

CROSS-REFERENCE TO RELATED APPLICATION

The present application is a U.S. national stage filing under 35 U.S.C. §371 of International Application No. PCT/US14/12042, filed on Jan. 17, 2014.

BACKGROUND

Generally, it can be difficult to align and couple adjacent optical guides so that the optical signal can traverse from one optical guide to another optical guide. Difficulties can arise due to precision and registration requirements of the aligned and coupled optical guides. Often the precision and registration requirements can result in high costs of manufacture, which may be due to the high failure rate and difficulty of reworking a misaligned optical guide coupling. Accordingly, it can be advantageous to provide an improvement for aligning and coupling adjacent optical guides that comply with precision and registration requirements with lower costs of manufacture.

SUMMARY

In some embodiments, a method of optically aligning optical guides is provided. The method can include positioning ends of first and second optical guides proximate a pressure-sensitive material, and pressing the ends of first and second optical guides against the pressure-sensitive material to induce a change in a refractive index of the pressure-sensitive material.

In another embodiment, a method of optically aligning optical guides can include positioning a first end of a first optical guide and a second end of a second optical guide in contact with a material having a variable refractive index. The method can include inducing a change in a refractive index of a portion of the material sufficient to enable transmission of light from the first end of the first optical guide through the material to the second end of the second optical guide.

In some embodiments, a method of optically coupling optical guides is provided. The method can include pressing a first end of a first optical guide and a second end of a second optical guide against an optical interconnect so as to change a refractive index of a portion of the optical interconnect between the first end and the second end.

In some embodiments, an assembly to align optical guides is provided. The assembly can include a housing with a first opening and a second opening and a channel that extends between the first opening and second opening. The first opening can be configured to receive a first end of a first optical guide. The second opening can be configured to receive a second end of a second optical guide. The assembly can also include an optical interconnect with a pressure-responsive variable refractive index positioned within the channel. The pressure-responsive variable refractive index can be capable of varying upon application of pressure. The variable refractive index can be adjustable by adjusting the pressure applied thereto by the first and second optical guides. Prior to receiving the first and second optical guides, the refractive index can be a base refractive index.

In some embodiments, an optical interconnect can be located between a first optical guide with a first optical guide end and a second optical guide with a second optical guide end. The first optical guide and the second optical guide can each have an operational wavelength, which can be substantially the same such that light of such a wavelength can propagate therethrough and through the optical interconnect. The optical interconnect can include a pressure-sensitive material with a first region with a first refractive index at the operating wavelength. The pressure-sensitive material can include a second region with a second refractive index at the operating wavelength located between the first optical guide end and the second optical guide end. The first region can be at least partially in contact with the second region. The second region can be induced by a mechanical pressure applied between the first guide end and the second guide end. The optical interconnect can be configured to convey light at the operational wavelength along at least part of the second region between the first guide end and the second guide end.

In some embodiments, an optical interconnect can include a pressure-sensitive composite material having a first face and a second face. The first and second faces can be generally parallel to orthogonal with respect to each other. The pressure-sensitive composite material can include an elastomeric material with a first refractive index, and can include a rigid material with a second refractive index that is different from the first refractive index. The rigid material can have a higher elastic modulus than the elastomeric material. The optical interconnect can be configured to form a waveguide region between a portion of the first face and a portion of the second face when pressure is applied between the portion of the first face and the portion of the second face. The waveguide region can arise from an increase in the volume proportion of the rigid material in the pressure-sensitive material located between the portion of the first face and the portion of the second face.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information, as well as other features of this disclosure, will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1A:
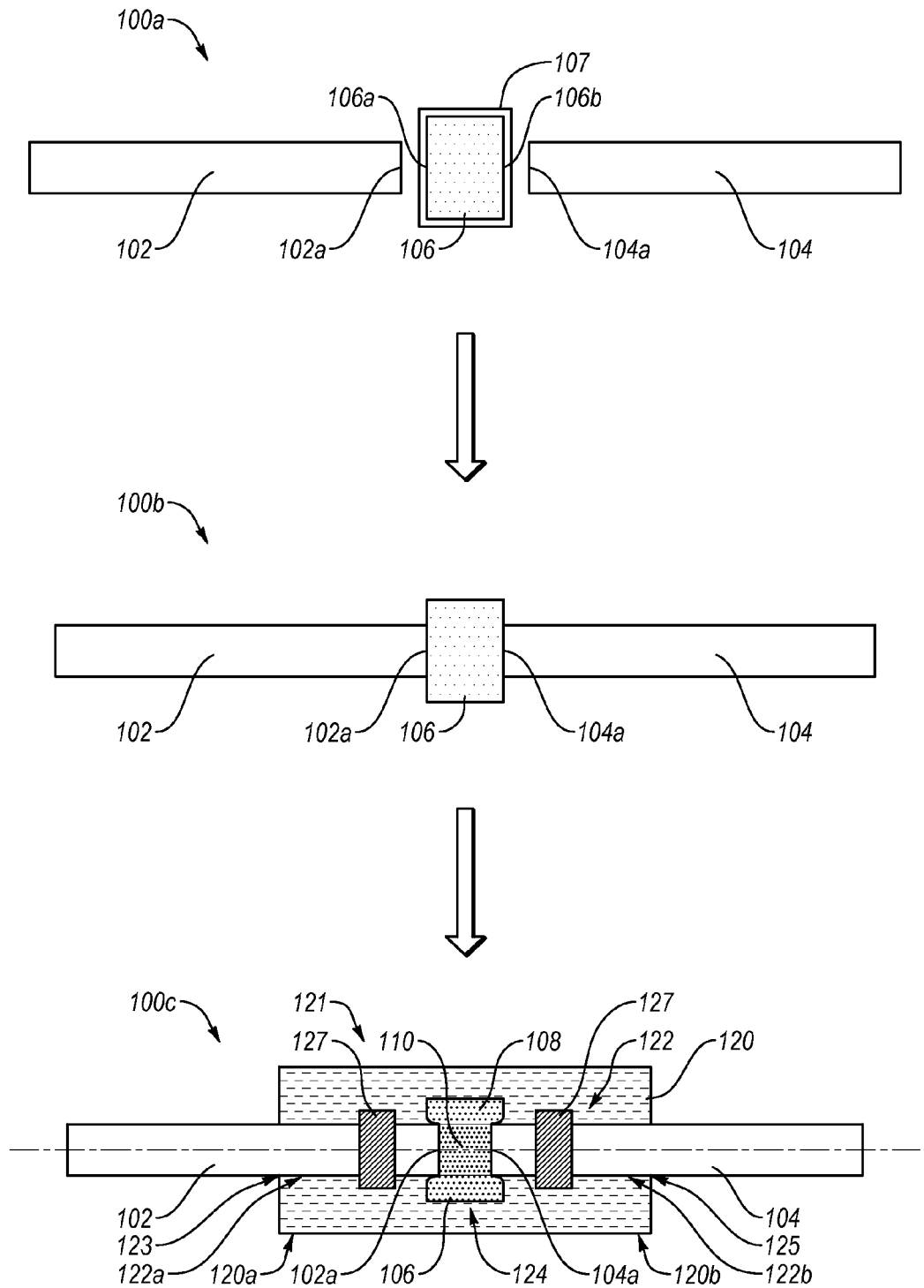
FIG. 1A illustrates an embodiment of a protocol for optically coupling a first optical guide with a second optical guide via an optical interconnect.

arranged in accordance with at least one of the embodiments described herein, and which arrangement may be modified in accordance with the disclosure provided herein by one of ordinary skill in the art.

All features of any of the embodiments of the figures can be combined and arranged with any of the other embodiments of other figures, such that disclosure of any feature in some embodiments may be practiced with other features of other embodiments.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology relates to optical interconnects that are configured to couple optical guides together, where an optical interconnect can be configured to include and/or evolve a high refractive index region that promotes light propagation therethrough so that light can be transferred through the optical interconnect with minimal loss. The high refractive index region can have a higher refractive index compared to a different region of the optical interconnect. The optical interconnect can be configured to respond to a stimulus in order for the high refractive index region to evolve and be obtained. The optical interconnect can be configured to have a first refractive index, which can be the resting or base refractive index that is maintained in the absence of a stimulus that increases the refractive index. Additionally, the optical interconnect can be configured to have a region with a second refractive index that is higher than the first refractive index, which higher second refractive index can be obtained when a stimulus is applied to the optical interconnect. The change to a higher refractive index can facilitate optical coupling between ends of optical guides so that minimal data or light is lost between the coupled optical guides or at the interface therebetween. When the stimulus is removed, the region with the higher second refractive index may in some cases reduce back to having the base, first refractive index.

While a material can have a different refractive index for each wavelength (and frequency) of light, the material of the optical interconnect can have a region with an increase in refractive index relative to each wavelength upon exposure to the stimulus. For example, the stimulus can change the refractive index of a region of the material for one or more wavelengths independent of the wavelength(s) being transmitted therethrough. As such, the optical interconnect can have a region with an increase in refractive index relative to a single wavelength as well as to a range of wavelengths passing through the optical interconnect when the stimulus is applied. The range of wavelengths that the optical interconnect can transmit therethrough may be any wavelength of light, within reason. Often, data communications employ wavelength ranges between 795 nm to 1.5 microns, where 850 nm to 1.35 microns are common; however, the optical interconnect is not limited to these wavelengths as technology may advance to include other wavelengths and any wavelength within reason (e.g., from x-ray to visible light to radio waves). As such, the optical interconnect under the technology described herein may be employed to any wavelength that is transmitted through an optical guide.

The refractive index of the material of the optical interconnect can increase as the density of the material increases. Accordingly, any stimulus that increases density of the material can be used to increase the refractive index. In one example, the increase in density can be obtained by pressure applied to the optical interconnect so that more material is squeezed into a defined volume, which increases the density of the material. The increase in density of the material can be localized to a region where pressure is applied or a region between pressure-applying members (e.g., optical guides). The increase in density can be in any region of the material of the optical interconnect, which can be an internal region, external region, or region between surfaces. The increase in density can be a gradient density increase where regions closer to the stimulus may have higher density and thereby a higher refractive index relative to regions further from the stimulus. As such, the density can be a gradient density from one location in the material of the optical interconnect to a different location of the optical interconnect. When two stimulus points are used, the gradient between the two stimulus points can be parabolic or sinusoidal or fluctuate or have an increase in density followed by a decrease in density, which may also be followed by another increase in density, between the stimulus points. For example, when pressure is the stimulus that is applied to one side of the material of the optical interconnect, the density and refractive index can be higher closer to the higher pressure region compared to the another side of the device not having pressure. In another example, when two pressure stimuli are applied to opposing surfaces of the material of the optical interconnect, the density and refractive index can be higher closer to each of the pressure regions compared to a middle or central region between the pressure regions; however, as further pressure is applied the two higher pressure regions can merge into a middle or central high-pressure region. In any event, the pressure application to the opposing sides of the material can increase the density and refractive index of a region of the material of the optical interconnect, which can be beneficial for facilitating optical transmissions through the optical interconnect, such as optical transmissions between the opposing pressure locations.

In some embodiments, the stimulus that can induce or cause a high refractive index region to evolve in the optical interconnect can include pressure, temperature, light, electric field, magnetic field, compositional changes, or combinations thereof. For example, electric fields may cause charged species within the elastomer or a liquid precursor to migrate to desired locations, and then to react with other constituents of the material to induce refractive index changes correlated with the effects of the field. Pressure stimuli can be applied to the material of the coupling material as described herein. Also, temperature can be used as a stimulus, where the change in density in response to the temperature change can be used to increase or decrease the refractive index, which is dependent on the type of material.

For example, vulcanizable silicone precursor liquid can be selectively heated at a particular location to induce a higher degree of cross-linking between polymer chains, which may produce a relatively higher or lower refractive index at the location of highest heating. An example of such a precursor liquid is RTV 615, as supplied by GE Silicones, where the vulcanizable liquid is formed by mixing a resin component with a curing agent in a predetermined ratio such as 10:1. Effective elevated temperatures include the ranges 50° C. to 150° C., or 70° C. to 110° C. In some instance (e.g., water), increasing temperature can increase density of the material of the optical interconnect, and thereby increase the refractive index. In some instances (e.g., elastomers), reducing temperature can increase density of the material of the optical interconnect, and thereby increase the refractive index. In some instances, certain wavelengths of light can cause chemical changes that may alter density of a material, which changes may be reversible or irreversible. For example, curing a polymer with light can cause an increase in density, and thereby cause an increase in refractive index. For example, Silopren silicone material by Bayer AG can be cured by ultraviolet light in the wavelength range of 300 nm to 400 nm, and Novagard UV silicone by Novagard Solutions can also be ultraviolet-cured; both materials can be cured at room temperature or at elevated temperatures to allow control over cross-linking densities and curing speeds. The density of the material, in the case of cross-linking curing reactions, can be generally related to the final refractive index. The material density may depend on the number density of crosslinking bonds between polymer chains within the elastomer structure. The number density of cross-linking bonds may, in turn, be determined by: the density of catalysts, which may carry a charge and be manipulated with electric or magnetic fields; and/or the flux of photons such as ultraviolet light interacting with sensitizer constituents; and/or the temperature distribution within the material during curing. The rate of crosslink formation may increase with temperature, such that differential heating may result in differential densities within the elastomer. However, curing a polymer can also be considered a compositional change, which is induced by light. As such, a composition can be exposed to light to change its compositional properties in order to change the refractive index, where generally increasing density or hardness may increase the refractive index.

The optical interconnect can be used to optically couple two optical guides together so that an optical signal can pass from one optical guide into and through the optical interconnect and then into and through another optical guide. The optical interconnect can have a first side or end that can be physically connected to an end of one optical guide and a second side or end that can be physically connected to an end of another optical guide. The physical connection or coupling can be implemented as described herein. Such physical connection of the optical interconnect between two optical guides can overcome optical coupling problems associated with connector and splice mechanisms, and thereby inhibit one or more of the following optical coupling problems: end gap, concentricity, end angle, NA mismatch, finish and dirt, coaxiality, axial run-out, core mismatch, back-reflection, or other common problems that may occur during coupling optical guides. Also, the optical interconnect can have a continuous surface, such as a curved surface that connects to ends of both optical guides such that light passes between the ends through the optical interconnect, where a spherical optical interconnect is an example.

The optical interconnect and coupled optical guides can be included in a housing, such as a ferule, sleeve, cladding, or other structure that has a lumen for receiving the optical guides and optical interconnect. The housing can include a cavity for the optical interconnect that is fluidly coupled to one or more lumens or channels for the optical guides (see environment 100c of FIG. 1A). In some aspects, the housing can be configured for a permanent optical coupling of the optical guides by the optical interconnect, which may include adhesives or other fixing members to fix the optical guides and/or optical interconnects together and/or to the housing. In another aspect, the housing can be configured for removable coupling, where the housing can be configured similar to optical connectors such as an ST connector with a bayonet mount and cylindrical ferrule, FC/PC connector, SC snap-in connector, LC connector with a 1.24-mm ferrule, MT-RJ duplex connector, opti-jack duplex connector, Volition duplex connector, E2000/LX-5 connector, MU connector with 1.25-mm ferule, MT ribbon cable connector, or any other connector.

The following figures describe some embodiments of the optical interconnect of the present technology; however, other embodiments can be realized by practicing the present disclosure. The figures describe the optical interconnect to be pressure-sensitive; however, other stimulus-responsive materials may also be employed. The optical interconnect is shown to provide a means for coupling optical guides with enhanced performance, which can compensate for coupling errors such as misalignment, being offset, or completely offset. The optical interconnect is configured to have a region that evolves an increase in refractive index upon coupling with the optical guides and thereby provide increased refractive index between cores of the optical guides in order to improve transmission between cores of the optical guides. The increase in refractive index in the region of the optical interconnect can be realized by pressure supplied by the optical guides being pushed into the optical interconnect. As such, the optical interconnect can be elastomeric and deformable so as to increase in density under pressure and provide the increase in refractive index. The pressure applied to the optical interconnect causes a region thereof to have an increase in mass of the material of the optical interconnect per volume, and hence the density of the region increases so as to increase the refractive index. Such an optical interconnect can be used as an optically self-aligning optical interconnect due to these properties, and thereby self-form an optical path between the optical guides upon receiving pressure from the optical guides. The materials and features are provided after the discussions of the figures to provide details of the embodiments of the optical interconnect, materials thereof, manufacture thereof, devices thereof, and use thereof.

FIG. 1A illustrates an embodiment of protocol for optically coupling a first optical guide 102 with a second optical guide 104 via an optical interconnect 106. The optical interconnect 106 can be formed from a pressure-sensitive material. Environment 100a illustrates the first optical guide 102 having a first end 102a proximal to a first side 106a of the optical interconnect 106, and the second optical guide 104 having a second end 104a proximal to a second side 106b of the optical interconnect 106. The optical interconnect is shown with optional coating 107.

Environment 100b illustrates the first optical guide 102 having the first end 102a being pressed into the first side 106a so as to apply pressure to the optical interconnect 106, and the second optical guide 104 having the second end 104a being pressed into the second side 106b so as to apply pressure to the optical interconnect 106. As the pressure is applied to the optical interconnect 106, the pressure causes a change in the optical properties of the pressure-sensitive material, which can cause a change in the refractive index of the region of the optical interconnect 106 between the first and second ends 102a, 104a. The change of the refractive index can be an increase in the refractive index in the region in the optical interconnect 106 between the ends 102a, 104a by application of increased pressure from the first optical guide 102 and second optical guide 104.

Environment 100c illustrates the first optical guide 102 having the first end 102a sufficiently pressed into the first side 106a to form a recess therein, and the second optical guide 104 having the second end 104a sufficiently pressed into the second side 106b to form a recess therein so that the applied pressure of the first optical guide 102 and second optical guide 104 into the optical interconnect 106 causes an increased refractive index region 110 to be formed therein between the ends 102a, 104a. The increased refractive index region 110 has an increased refractive index compared to base refractive index region 108. The portions of the optical interconnect 106 not between the ends 102a, 104a can include the base refractive index region 108. As shown, the first optical guide 102 and second optical guide 104 each includes a core or central axis as represented by the dashed lines therein. In environment 100c, the core or central axis of the first optical guide 102 and second optical guide 104 are substantially aligned. Environment 100c also shows an optical aligning assembly 121 having a mechanical optical guide coupler 120 a coupling lumen 122 with a first resilient channel 122a having a first opening 123 on a first surface 120a and a second resilient channel 122b having a second opening 125 on a second surface 120b, and fasteners 127 in the coupling lumen 122, and a cavity 124 having the optical interconnect 106.

Also, environment 100c shows a mechanical optical guide coupler 120, which can mechanically couple the first optical guide 102 and second optical guide 104 by having a coupling lumen 122 therein that receives the first optical guide 102 and second optical guide 104, as well as the optical interconnect 106. The mechanical optical guide coupler 120 may also have a cavity 124 dimensioned to retain the optical interconnect 106. The optical guides 102, 104 and mechanical optical guide coupler 120 may include cladding or other common features, which can be included in any of the embodiments of the technology described herein.

Accordingly, an embodiment of an optical aligning assembly 121 can be provided to align optical guides 102, 104. The optical aligning assembly 121 can include a housing (e.g., mechanical optical guide coupler 120) with a first opening 123 and a second opening 125 and a channel (e.g., coupling lumen 122) that extends between the first opening 123 and second opening 125. The first opening 123 can be configured to receive the first end 102a of the first optical guide 102, and the second opening 125 can be configured to receive the second end 104a of the second optical guide 104. The optical interconnect 106 is prepared with a pressure-sensitive material that has a pressure-responsive variable refractive index. The variable refractive index can be adjustable by adjusting pressure from the first and second ends 102a, 104a. Without pressure, the refractive index can be a base refractive index. The optical interconnect 106 can be positioned within the channel (e.g., coupling lumen 122). The optical interconnect 106 with the pressure-responsive variable refractive index is capable of varying refractive index upon application of pressure from the first and second optical guides 102, 104. The optical interconnect 106 can be configured with a pressure-sensitive material with a base refractive index without applied pressure and a higher refractive index with applied pressure. The first end 102a of the first optical guide 102 can be located in the first opening 123 and biased against the optical interconnect 106, and the second end 104a of the second optical guide 104 can be located in the second opening 125 and biased against the optical interconnect 106 so as to provide the pressure to increase the refractive index therebetween.

As shown, the first opening 123 is on a first surface 120a of the housing (e.g., mechanical optical guide coupler 120) and the second opening 125 is on a second surface 120b of the housing. In some aspects, the first opening 123 is on the first surface 120a of the housing and the second opening 125 is on an opposite second surface 120b of the housing. As such, the housing can be an elongate member having the first opening 123 and second opening 125 on opposite ends 120a, 120b. However, the first and second openings can be on different surfaces that are at an angle from each other, such as an angle from 1 degree to 179 degrees or any angle therebetween. In one example, the openings 123, 125 can be orthogonal. The surfaces of the optical interconnect 106 that receive the optical guides 102, 104 can be parallel or at an angle corresponding with the openings 123, 125, such as an angle from 1 degree to 179 degrees or any angle therebetween, where 90 degrees is an example.

In some embodiments, the housing (e.g., mechanical optical guide coupler 120) can include a resilient material that defines a first resilient channel 122a at the first opening 123 extending to the optical interconnect 106, and that defines a second resilient channel 122b at the second opening 125 extending to the optical interconnect 106. The housing can be configured to support the optical interconnect 106 and to mechanically connect the first optical guide 102 and second optical guide 104 to the housing. As such, the optical interconnect 106 can be positioned between the first resilient channel 122a and second resilient channel 122b. Accordingly, the chamber 124 may be between the first resilient channel 122a and second resilient channel 122b. In some aspects, the first resilient channel 122a is configured to guide the first optical guide to the optical interconnect and the second resilient channel is configured to guide the second optical guide to the optical interconnect. The resilient material can be any resilient material and the resiliency can vary. The resilient material can be any of various polymers, plastics, elastomers, plastomers, rubbers, or metals that can be configured with the properties and to perform the functions as described herein.

In some embodiments, the optical interconnect 106 can be prepared from a pressure-sensitive material that is an elastomer. Also, as described in more detail below, the optical interconnect 106 can be a composite material with the elastomer as one component thereof. The elastomer can be selected from the group consisting of silicones, nitriles, butadienes, polyurethanes, or combinations thereof. The elastomer or composite can be configured to have an increased refractive index from a base refractive index of about 1.5 to an increased refractive index of about 1.7. In some aspects, the increased refractive index can be about 1.6. In some aspects, the increased refractive index is approximately equal to or higher than a core refractive index of the first optical guide 102 and/or second optical guide 104. In some aspects, the base refractive index is approximately equal to or higher than a core refractive index of the first optical guide 102 and/or second optical guide 104. The examples of refractive indexes provided herein may be the base refractive index before the increase under the stimulus, or the refractive indexes may be the increased refractive index obtained by the stimulus (e.g., pressure). In one aspect, the increased refractive index of the pressure-sensitive material obtained by the stimulus can be matched to the optical guides.

In some embodiments, optical aligning assembly 121 can include a fastener 127 configured to secure the ends 102a, 104a of the first and second optical guides 102, 104 relative to the optical interconnect 106. Each optical guide 102, 104 can have an individual fastener 127. Alternatively, a single fastener 127 may be configured to fasten both the first and second optical guides 102, 104 to the optical interconnect 106. The fastener 127 can be configured to maintain pressure of the first and second ends 102a, 104a of the first and second optical guides 102, 104 against the optical interconnect 106. The embodiments of the fastener 127 can vary in configuration, such as from a rubber or polymer sleeve to adhesives or to plastic or metal clamps.

In some embodiments, the optical interconnect 106 can be located between a first optical guide 102 with a first end 102a and a second optical guide 104 with a second end 104a. The first optical guide 102 and the second optical guide 104 have an operational wavelength, such as any of the wavelengths described herein. The optical interconnect 106 can include a pressure-sensitive material with a first region (e.g., base refractive index region 108) with a first refractive index at the operating wavelength, and a second region (e.g., increased refractive index region 110) with a second refractive index at the operating wavelength located between the first optical guide end 102a and the second optical guide end 104a. The first region can at least partially be in contact with the second region. The second region can be induced or evolved by a mechanical pressure applied between the first optical guide end 102a and the second optical guide end 104a. The optical interconnect 106 can be configured to convey light at the operational wavelength along at least part of the second region between the first optical guide end 102a and the second optical guide end 104a. In some aspects, the optical interconnect 106 has a first face (e.g., first side 106a) and a second face (e.g., second side 106b), wherein the first optical guide end 102a is pressed against the first face, and the second optical guide end 104a is pressed against the second face. The optical interconnect 106 can have a narrowed portion (e.g., increased refractive index region 110) located between the first optical guide end 102a and the second optical guide end 104a compared to a different portion (e.g., base refractive index region 108) not between (e.g., relative to, surrounding, adjacent, proximate, or other) the first optical guide end 102a and the second optical guide end 104a.

Figure 8A:
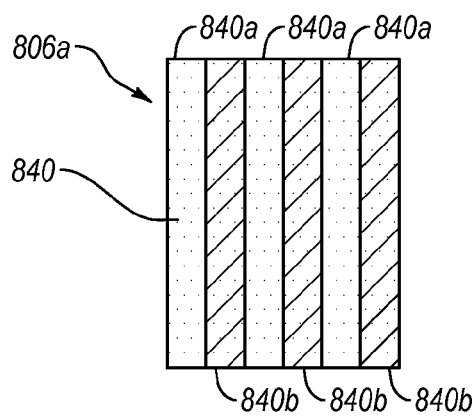
FIG. 8A illustrates an embodiment of a layered composite optical interconnect.
Figure 8B:
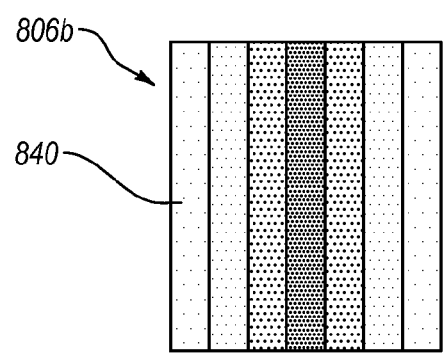
FIG. 8B illustrates an embodiment of a gradient layered composite optical interconnect.

In some embodiments, optical interconnect 106 can include a coating 107, for example, including a first coating on the first face (e.g., first side 106a) and a second coating on the second face (e.g., second side 106b). The first and second coatings may be different coatings or a coating 107 encapsulating the optical interconnect 106 can form the first and second coatings. The first and second coatings 107 can be configured to prevent the optical guides 102, 104 from passing through the first and second coatings 107 into the pressure-sensitive material of the optical interconnect 106. The coating 107 can be transparent to the operating wavelength, and can be tougher and less resistant to tearing, puncturing, or perforation than the pressure-sensitive material. For example, the coating 107 can be a polymer coating, such as polyurethane, vinyl, or polyethylene, or combinations thereof or the like. In some aspects, the coating 107 can be a layer, such as shown in FIGS. 8A-8B.

Accordingly, the optical interconnect 106 can be used in a method for optically aligning optical guides 102, 104. The optical aligning method can include: positioning the ends 102a, 104a of first optical guide 102 and second optical guide 104 proximate the pressure-sensitive material of the optical interconnect 106; and pressing the ends 102a, 104a against the pressure-sensitive material of the optical interconnect 106 to induce a change in a refractive index of the pressure-sensitive material. Such an optical aligning method can include urging the ends 102a, 104a against the pressure-sensitive material of the optical interconnect 106 sufficient to increase the refractive index of the pressure-sensitive material. Accordingly, the ends 102a, 104a may be pressed into the pressure-sensitive material in order to form two different recesses in the optical interconnect 106 that receive the individual ends 102a, 104a. In an example, each of the optical guides 102, 104 can include one or more optical fibers, such as a single fiber embodiment or a ribbon fiber embodiment that has a plurality of waveguides.

The optical interconnect 106 can be obtained by selecting the pressure-sensitive material to include an elastomeric material that has a base refractive index that is capable of changing to be higher than the base refractive index. Such a change in refractive index can be between the ends 102a, 104a that are pressed into the optical interconnect 106 to change the physical properties of the region therebetween, such as increase the density, which increases the refractive index in the region.

The optical alignment method can include positioning the first end 120a of the first optical guide 102 on a first side 106a of the optical interconnect 106 and positioning the second end 104a of the second optical guide 104 on a different, second side 106b of the optical interconnect 106. This can include positioning the first end 102a of the first optical guide 102 on a first side 106a of the optical interconnect 106 and positioning the second end 104a of the second optical guide 104 on an opposite, second side 106b of the optical interconnect 106. However, the surfaces can be at any angle from parallel to orthogonal.

The optical alignment method can include inserting the ends 102a, 104a of the first and second optical guides 102, 104 in opposite sides of a housing (e.g., mechanical optical guide coupler 120) that contains the optical aligning assembly 121, and then securing the first and second optical guides 102, 104 with the pressure-sensitive material of the optical interconnect 106 in the housing. The optical alignment method can also include pressing the first end 102a of the first optical guide 102 against a first side 106a of the pressure-sensitive material of the optical interconnect 106; and pressing the second end 104a of the second optical guide 104 against a second side 106b of the pressure-sensitive material of the optical interconnect 106.

The optical alignment method can include securing the ends 102a, 104a of the first and second optical guides 102, 104 against the optical interconnect 106 sufficient to bias an applied pressure on the pressure-sensitive material of the optical interconnect 106. The securing can be by the optical aligning assembly 121 and/or fastener 127, or any other way of fastening, which can include adhesives. In some aspects, the pressing can induce curvature to both the first side 106a (e.g., first surface) and the second side 106b (e.g., second surface) of the optical interconnect 106 to form a narrowed portion (e.g., increased refractive index region 110) of the pressure-sensitive material of the optical interconnect 106 between the first end 102a of the first optical guide 102 and the second end 104a of the second optical guide 104. This can include narrowing a portion of the pressure-sensitive material of the optical interconnect 106 between the first side 106a and second side 106b of the optical interconnect 106 from an initial dimension to a smaller dimension. The initial dimensions and narrowed dimensions can vary. For example, the initial dimension can range from about 1 micron to about 20 cm, 10 microns to 2 cm, 100 microns to 2 mm, or 500 microns to 1 mm, or any range therebetween, and the narrower dimension can be 1%, 2%, 5%, 10%, 20%, 25%, 30%, 40%, 50%, 60%, 70%, 75%, 80%, 90%, or 95% of the initial dimension. In one example, the initial dimension can be about 500 microns to about 1 mm, and compression can result in a decrease of the dimension of about 2% to about 10%.

In some embodiments, the optical alignment method can include positioning a first end 102a of a first optical guide 102 and a second end 104a of a second optical guide 104 in contact with a material of the optical interconnect 106 having a variable refractive index, and then inducing a change in a refractive index of a portion of the material sufficient to enable transmission of light from the first end 102a of the first optical guide 102 through the material of the optical interconnect 106 to the second end 104a of the second optical guide 104. This can include changing the refractive index of the portion of the material so as to form an optical path between the first end 102a of the first optical guide 102 and the second end 104a of the second optical guide 104, which can include changing the refractive index from a first refractive index to a higher second refractive index. The optical path formed or evolved in the optical interconnect 106 can be a pressure-induced optical waveguide. Light can then be transmitted from the first end 102a of the first optical guide 102 through the material of the optical interconnect 106 to the second end 104a of the second optical guide 104. For example, the other ends of the optical guides 102, 104 can be coupled to a light emitter (e.g., laser) and to a light receiver (e.g., photodiode).

While using pressure to change the refractive index has been described, some materials of the optical interconnect 106 can change refractive index by other stimuli. Accordingly, the optical alignment method can include applying one or more of a compressive force, a tensile force, and a shear force to surfaces (e.g., 106a, 106b) of the material of the optical interconnect 106 that induces the change in the refractive index of the material. A tensile force may be applied to the optical interconnect 106 in a fashion that stretches the axial region of the optical interconnect 106 by a smaller degree than the off-axis region, such that the axis defines an optical path of relatively higher refractive index. In this method, the base refractive index of the material of the optical interconnect 106 can be chosen to be close to the core refractive index of the first optical guide 102 and/or second optical guide 104. This can be useful when an axial region of higher base refractive index also has mechanical properties that include a higher elastic modulus than the surrounding material of the optical interconnect 106. Higher crosslinking bond density in elastomers, such as silicones, nitriles, polyurethanes, and polyisoprenes, may result in the desired combination of higher base refractive index and higher rigidity. The amount of tensile force can depend on the mechanical properties of the material of the optical interconnect 106. By way of example, a force of 0.5 to 20 Newtons can be applied to an optical interconnect 106 with a cross-sectional area between 0.1 mm$^2$ and 2 mm$^2$, or alternately a force of 2 to 10 Newtons can be applied to an optical interconnect 106 with cross-sectional area of about 1 mm$^2$ for achieving the desired change in refractive index. An example of a desirable refractive index change can be generally between 0.05 and 0.2 at the operating wavelength of the optical guides 102 and 104, and more typically in the range 0.1 to 0.2. Shear force may also be applied to the optical interconnect 106 so as to define a path with relatively higher refractive index between the first optical guide 102 and the second optical guide 104. Shear force applied between the faces 106a and 106b of the optical interconnect 106 may differentially extend and compress particular regions of the optical interconnect 106, as a result of variations in the cross-sectional profile of the optical interconnect 106 in the region between the faces 106a and 106b.

In some embodiments, the optical alignment method can include exposing a portion of the material of the optical interconnect 106 to light having a wavelength that induces the change in the refractive index of the material. The change can include an increase of refractive index as described herein. Light is known to impart physical and chemical changes to some materials, which can be utilized for increasing the refractive index to the portion between the ends 102a, 104a of the optical guides 102, 104. In one example, the material in a liquid or other flowable formulation with a base refractive index can be applied between the ends 102a, 104a and then cured with light (e.g., photopolymerization and/or crosslinking) to change the physical and chemical properties of the material to be more solid or elastomeric and to have a higher refractive index. The initial composition may also be partially cured so that the light further cures the optical interconnect 106. Here, the ends 102a, 104a may or may not be pressed further into the cured material of the optical interconnect 106.

In some embodiments, the optical alignment method can include exposing the portion of the material of the optical interconnect 106 to an electric or magnetic field that induces the change in the refractive index of the material. For example, the material of the optical interconnect 106 may be piezoelectric, such that the application of an electric field between the first optical guide 102 and the second optical guide 104 causes the material in this region to contract. The contraction raises the refractive index of this region, defining an optical path. In an example, the optical guides 102 and 104 can be electrically conductive, or have a coating which is electrically conductive, or be associated with an electrically conductive member, or a separate electrically conductive member may be used. Other configurations can include additional conductive elements, inserted near the optical guides 102, 104 to facilitate the application of a desired electric field distribution. In an example, piezoelectric particles may be added to the material of the optical interconnect 106 to provide the desired piezoelectric properties for the bulk of the optical interconnect 106. Analogous to the application of an electric field to a piezoelectric material, application of a magnetic field to the region between the first and second optical guides 102,104 may increase the material density, and therefore the refractive index, where the optical interconnect 106 material is ferromagnetic. Non-metallic ferromagnetic additives can be used to decrease optical absorption. Example additives include p-nitrophenyl nitronyl nitroxide, or conjugated polymers such as poly(3-hexylthiophene) with phenyl-C61-butyric acid methyl ester.

In some embodiments, the optical alignment method can include chemically treating the portion of the material of the optical interconnect 106 with a chemical reagent that induces the change in the refractive index of the material. In some aspects, this can include chemically curing the material, which can be curing from a liquid of flowable formulation to a solid or elastomeric member. The chemical treatment may include the modification of the polymer molecules, such as the addition of side groups with desirable optical properties. For example, the refractive index can be raised by the addition of phenyl groups, or lowered by the addition of fluorine-containing groups. Also, a few percent by weight of low-molecular-weight groups with desirable properties can be added to precursor resins prior to curing; even without chemical reactions, these additives can be incorporated into the final elastomer for the chemical treatment. It may also include further curing a partially cured elastomeric member to have further curing, polymerization, or crosslinking. Here, the optical interconnect 106 can be applied to the ends 102a, 104a of the optical guides 102, 104 in a liquid or partially cured format, and then chemically treated with a curing agent (e.g., cross-linking agent, polymerization agent, catalyst, etc.) to form the operational optical interconnect 106.

The ends 102a, 104a of the optical guides 102, 104 may be unpolished, partially polished, or fully polished, or configured as known for optical guides (e.g., optical fibers). As such, the optical alignment method can include selecting at least one of the ends 102a, 104a of the first and second optical guides 102, 104 to be substantially unpolished or partially polished or fully polished.

In some embodiments, a method of optically coupling optical guides 102, 104 can be provided. Such a method of optically coupling can include any of the method steps or components thereof of the optical alignment method, or vice versa. Here, the optical guides 102, 104 are optically coupled by the optical interconnect so that light passes from the first optical guide 102 through the optical interconnect 106 and into the second optical guide 104. One or more optical elements, such as lenses, collimators, dispersers, combiners, multiplexers, or the like may be positioned between the optical guides 102, 104 and optical interconnect 106 such that they are optically coupled. Also, the optical guides 102, 104 may or may not be optically aligned, but are optically coupled so that light passes therebetween by passing through the optical interconnect 106 positioned therebetween. The optical coupling method can include pressing a first end 102a of a first optical guide 102 and a second end 104a of a second optical guide 104 against an optical interconnect 106 so as to change a refractive index of a portion of the optical interconnect 106 between the first end 102a and the second end 104a. This can include increasing pressure in the portion by the pressing, which increase in pressure can increase the refractive index of the portion. The pressing can cause induce or evolve changing the refractive index of the portion so as to promote light propagation through the portion. This can include increasing the refractive index of the portion (e.g., increased refractive index region 110) compared to a base refractive index of a remainder portion (e.g., base refractive index region 108) of the optical interconnect 106. This may also include changing the refractive index of the portion (e.g., increased refractive index region 110) compared to a base refractive index of a remainder portion of the optical interconnect 106 so as to promote light propagation through the portion relative to the remainder portion. In some aspects, the pressing of the first end 102a of the first optical guide 102 and the second end 104a of the second optical guide 104 against the optical interconnect 106 can be sufficient to deform the optical interconnect 106 therebetween. In some aspects, the first and second sides 106a, 106b of the optical interconnect 106 can be deformed. In another aspect, the region of the optical interconnect between the first and second sides 106a, 106b that are also between the first and second ends 102a, 104a of the optical guides 102, 104 may also be deformed. The deformation can be compression of the material of the optical interconnect 106. Such a deformation may result in a change of density of the portion because more mass of the material of the optical interconnect is squeezed into a volume thereof. The density may be considered by only the material or considered by a combination of the material and any liquid (e.g., water, alcohol, etc.) within the material or gas (e.g., air, oxygen, nitrogen, carbon dioxide, etc. within the material. The liquid or gas may be squeezed from the material of the optical interconnect 106 by the pressing. The change in density of the portion (e.g., increased refractive index region 110) can be compared to a base density of the remainder portion (e.g., base refractive index region 108) of the optical interconnect 106, where the remainder portion may retain the base refractive index. The increase in density may evolve the increase in refractive index.

In some embodiments, the optical coupling method can include creating a refractive index gradient in the portion and/or around the portion having the higher refractive index. The refractive index gradient can be generated by pressing the ends 102a, 104a into the elastomeric optical interconnect 106, which has properties similar to a shock absorber so that regions more adjacent to the ends 102a, 104a have higher pressure and thereby higher refractive index compared to more distant regions, which thereby causes a refractive index gradient between the ends 102a, 104a. In some aspects, the refractive index gradient can have a parabolic gradient that has higher refractive indices adjacent to the ends 102a, 104a with a lower refractive index therebetween. This can occur during initial pressing. In another aspect, the refractive index gradient can have a parabolic gradient with the middle region having the higher refractive index and the regions adjacent to the ends 102a, 104a can have the lower refractive index, which can occur during high pressing due to merging of the pressure-absorbing properties occurring in the middle of the optical interconnect 106 between the ends 102a, 104a. Also, when the region of the optical interconnect 106 has high pressure and high refractive index, the refractive index gradient can occur moving away from the high refractive index region, such as toward ends or surfaces of the optical interconnect 106 that are not receiving pressure.

Figure 1B:
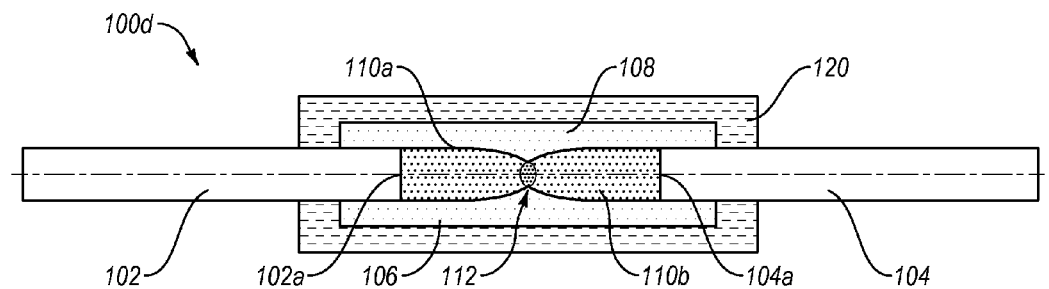
FIG. 1B illustrates an operating environment having aligned first and second optical guides sufficiently pressed into an optical interconnect so that the applied pressure forms an increased refractive index region in the optical interconnect between the aligned first and second optical guides.

FIG. 1B shows environment 100d having the first optical guide 102 with the first end 102a sufficiently pressed into the first side 106a so that the applied pressure forms a first increased refractive index region 110a on the first side 106a of the pressure-sensitive optical interconnect 106. Also, the second optical guide 104 having the second end 104a is sufficiently pressed into the second side 106b so that the applied pressure forms a second increased refractive index region 110b on the second side 106b. The increased refractive index regions 110a, 110b may be the same or different, but both have an increased refractive index compared to base refractive index region 108. In environment 100d, the core or central axis of the first optical guide 102 and second optical guide 104 are substantially aligned. The pressures applied can form an increased refractive index junction 112 between the increased refractive index regions 110a, 110b. The increased refractive index junction 112 can allow for an optical signal to be propagated between the increased refractive index regions 110a, 110b, and thereby allow for the optical signal to be propagated from the first optical guide 102 to the second optical guide 104. The increased refractive index junction 112 can include a refractive index that may be greater than, the same as, or less than the refractive index of one or more of the increased refractive index regions 110a, 110b, which allows for the propagation of the optical signal as described herein.

In some embodiments, the optical methods can include aligning the first end 102a of the first optical guide 102 with the second end 104a of the second optical guide 104. As shown, the optical guides 102, 104 are substantially aligned. This can include aligning a first axis of the first optical guide 102 with a second axis of the second optical guide 104, where the two axes are aligned.

In some embodiments, the optical methods include: forming a first compressed region (e.g., first increased refractive index region 110a) in the optical interconnect 106 with the first end 102a of the first optical guide 102; forming a second compressed region (e.g., second increased refractive index region 110b) in the optical interconnect 106 with the second end 104a of the second optical guide 104; and forming an optical junction (e.g., increased refractive index junction 112) between the first compressed region and the second compressed region so as to be optically coupled. The optical methods can include forming the optical junction to be aligned with the first compressed region and the second compressed region. The optical methods can include forming the first compressed region to have a higher refractive index compared to a remainder portion 108 of the optical interconnect 106, and forming the second compressed region to have a higher refractive index compared to a remainder portion 108 of the optical interconnect 106. In some aspects, the optical methods can include forming the optical junction to have a higher refractive index compared to a remainder portion 108 of the optical interconnect 106, which may also include forming the optical junction to have a higher refractive index compared to the first compressed region and/or the second compressed region.

As shown, the first and second optical guides 102, 104 are physically aligned by the optical aligning assembly. However, the nature of the optical interconnect can optically align first and second optical guides 102, 104 that are physically offset. By being offset, the cores of the optical guides 102, 104 may be offset but may overlap to some degree (see FIG. 1C).

Figure 1C:
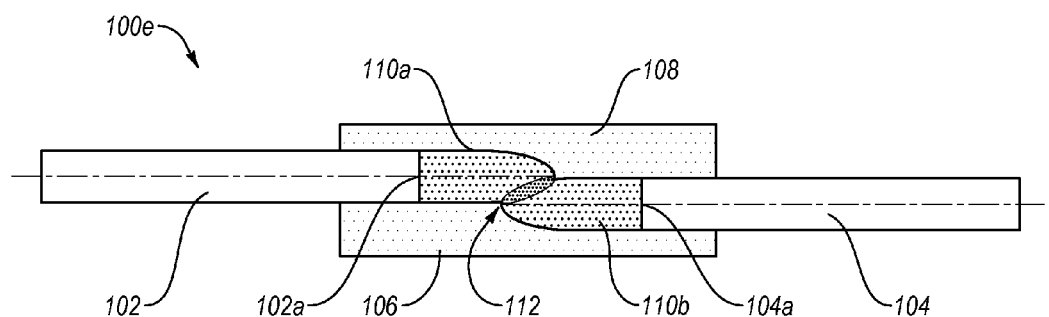
FIG. 1C illustrates an operating environment having offset first and second optical guides sufficiently pressed into an optical interconnect so that the applied pressure forms an increased refractive index region in the optical interconnect between the offset first and second optical guides.

FIG. 1C shows environment 100e having the first optical guide 102 with the first end 102a sufficiently pressed into the first side 106a so that the applied pressure forms a first increased refractive index region 110a on the first side 106a of the optical interconnect 106. Also, the second optical guide 104 having the second end 104a is sufficiently pressed into the second side 106b so that the applied pressure forms a second increased refractive index region 110b on the second side 106b. The increased refractive index regions 110a, 110b may be the same or different, but both have an increased refractive index compared to base refractive index region 108. An increased refractive index junction 112 is between the increased refractive index regions 110a, 110b.

In environment 100e, the core or central axis of the first optical guide 102 and second optical guide 104 are substantially unaligned or offset. However, the pressures applied can form an increased refractive index junction 112 between the increased refractive index regions 110a, 110b that bridge between offset of the unaligned central cores or central axes. The increased refractive index junction 112 can allow for an optical signal to be propagated between the offset increased refractive index regions 110a, 110b, and thereby allow for the optical signal to be propagated from the first optical guide 102 to the second optical guide 104 through the optical interconnect 106 even though they are substantially unaligned or offset. The increased refractive index junction 112 can include a refractive index that may be greater than, the same as, or less than the refractive index of one or more of the increased refractive index regions 110a, 110b, which allows for the propagation of the optical signal as described herein even though the increased refractive index regions 110a, 110b are substantially unaligned or offset.

In some embodiments, the optical methods may intentionally or inadvertently result in misaligning the first end 102a of the first optical guide 102 so as to be offset with the second end 104a of the second optical guide 104b. The misaligning can be partially aligning so as to be offset through completely misaligning to be completely offset. In any event, the optical interconnect 106 facilitates optical coupling and/or optical aligning between misaligned optical guides 102, 104. In some aspects, the optical methods can then include optically coupling the misaligned first end 102a of the first optical guide 102 with the second end 104a of the second optical guide 104 with the optical interconnect 106. The optical methods can include misaligning a first axis of the first optical guide 102 so as to be offset with a second axis of the second optical guide 104, and optically coupling the misaligned first axis of the first optical guide 102 with the second axis of the second optical guide 104 with the optical interconnect 106. The optical methods can include forming the optical junction as an intersection between the first compressed region that is offset from the second compressed region.

The optical interconnect can also optically align the first and second optical guides 102, 104 that are completely offset. By being completely offset, the cores of the optical guides 102, 104 may not overlap and may have completely different axes (see FIG. 1D). For example, being offset may be offset to a dimension the same or less than the radius of the optical guides 102, 104, and being completely offset may be offset to a dimension that is greater than the radius of the optical guides 102, 104.

Figure 1D:
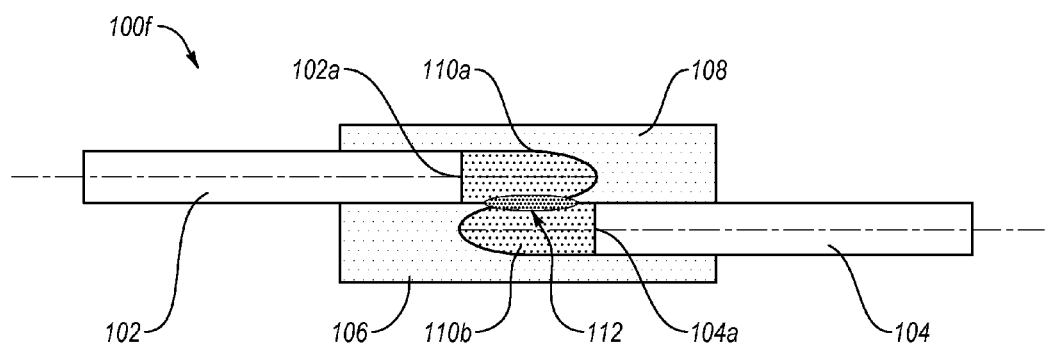
FIG. 1D illustrates an operating environment having completely offset first and second optical guides sufficiently pressed into an optical interconnect so that the applied pressure forms an increased refractive index region in the optical interconnect between the completely offset first and second optical guides.

FIG. 1D shows environment 100f having the first optical guide 102 with the first end 102a sufficiently pressed into the first side 106a so that the applied pressure forms a first increased refractive index region 110a on the first side 106a of the optical interconnect 106. Also, the second optical guide 104 having the second end 104a is sufficiently pressed into the second side 106b so that the applied pressure forms a second increased refractive index region 110b in the second side 106b of the optical interconnect 106. The increased refractive index regions 110a, 110b may be the same or different, but both have an increased refractive index compared to base refractive index region 108. An increased refractive index junction 112 is between the increased refractive index regions 110a, 110b.

In environment 100f, the core or central axis of the first optical guide 102 and second optical guide 104 are completely unaligned or offset. As shown, the sides of the first and second optical guides 102, 104 are so completely unaligned that the ends 102a, 104a of the first and second optical guides 102, 104 would not contact each other upon further longitudinal pressing. However, the pressures applied can form an increased refractive index junction 112 between the increased refractive index regions 110a, 110b that bridge between completely unaligned or offset central cores or central axes. The increased refractive index junction 112 can allow for an optical signal to be propagated between the completely offset increased refractive index regions 110a, 110b, and thereby allow for the optical signal to be propagated from the first optical guide 102 to the second optical guide 104 even though they are completely unaligned or offset. The increased refractive index junction 112 can include a refractive index that may be greater than, the same as, or less than the refractive index of one or more of the increased refractive index regions 110a, 110b, which allows for the propagation of the optical signal as described herein even though the increased refractive index regions 110a, 110b are completely unaligned or offset.

In some embodiments, the optical methods can include misaligning the first end 102a of the first optical guide 102 so as to be completely offset with the second end 104a of the second optical guide 104, and optically coupling the misaligned first end 102a of the first optical guide 102 with the second end 104a of the second optical guide 104 with the optical interconnect 106. In some aspects, the optical methods can include misaligning a first axis of the first optical guide 102 so as to be completely offset with a second axis of the second optical guide 104, and optically coupling the misaligned first axis of the first optical guide 102 with the second axis of the second optical guide 104 with the optical interconnect 106. In some aspects, the optical methods include increasing the refractive index between the first and second optical guides 102, 104 sufficiently to substantially mitigate misalignment of the first and second optical guides 102, 104, which results in optical coupling and/or optical alignment of the optical guides 102, 104.

Figure 2A:
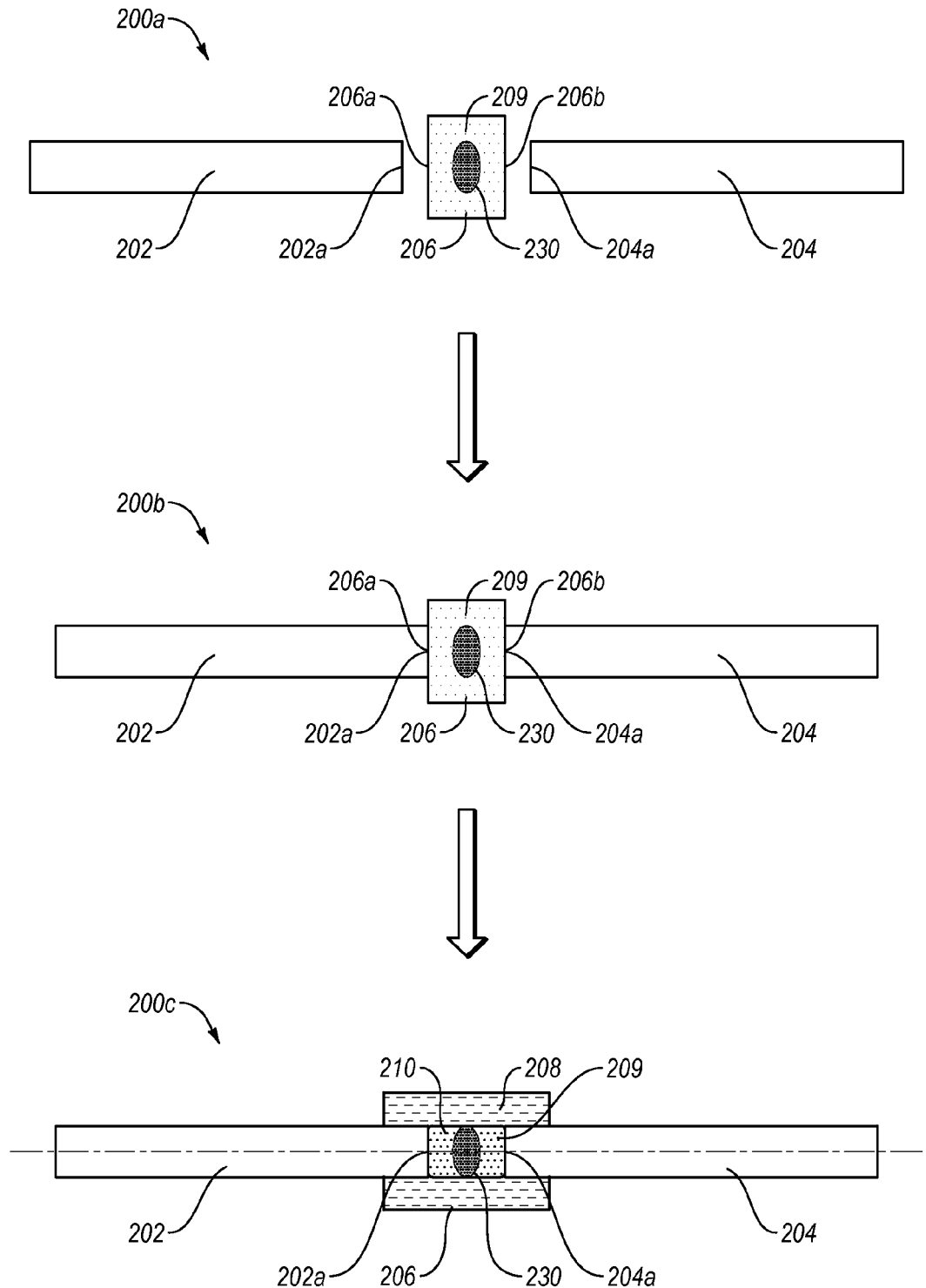
FIG. 2A illustrates an embodiment of protocol for optically coupling a first optical guide with a second optical guide via an optical interconnect that has an integral high refractive index region.

FIG. 2A shows an embodiment of protocol for optically coupling a first optical guide 202 with a second optical guide 204 via an optical interconnect 206 that has an integral high refractive index region 230. That is, the optical interconnect 206 includes the integral high refractive index region 230 with or without any pressure applied to the optical interconnect 206. The integral high refractive index region 230 is included in the optical interconnect 206 as a localization portion that has a higher refractive index with or without any applied stimulus. While shown to be centrally located, the integral high refractive index region 230 can be included at any location within the optical interconnect 206, and it may extend to or include any of the surfaces of the optical interconnect 206 and it may have any shape or other feature consistent with being of relatively higher refractive index compared to the base refractive index region 208. Accordingly, the optical methods can include selecting the pressure-sensitive material of the optical interconnect 206 to include a composite material that has an elastomeric material 209 and a rigid material (e.g., integral high refractive index region 230) internal of the elastomeric material 209, wherein the rigid material has a higher elastic modulus than the elastomeric material 209. The protocol includes environments 200a, 200b, and 200c.

Environment 200a illustrates the first optical guide 202 having a first end 202a proximal to a first side 206a of the optical interconnect 206, and the second optical guide 204 having a second end 204a proximal to a second side 206b of the optical interconnect 206.

Environment 200b illustrates the first optical guide 202 having the first end 202a being pressed into the first side 206a so as to apply pressure to the optical interconnect 206, and the second optical guide 204 having the second end 204a being pressed into the second side 206b so as to apply pressure to the optical interconnect 206. As the pressure is applied to the optical interconnect 206, the pressure causes a change in the optical properties thereof, which can cause a change in the refractive index. The change of the refractive index can be increased in the optical interconnect 206 by application of increased pressure from the first optical guide 202 and second optical guide 204. However, the integral high refractive index region 230 may retain the high refractive index, or it may also correspondingly increase further by applied pressure. The increased pressure at or around the integral high refractive index region 230 can increase the volume portion thereof compared to the rest of the optical interconnect 206, which may be due to localized density increased therearound.

Environment 200c illustrates the first optical guide 202 having the first end 202a sufficiently pressed into the first side 206a and the second optical guide 204 having the second end 204a sufficiently pressed into the second side 206b so that the applied pressure of the first optical guide 202 and second optical guide 204 into the optical interconnect 206 causes an increased refractive index region 210 to be formed therein. The increased refractive index region 210 has an increased refractive index compared to the base refractive index region 208, which may be lower, the same, or higher than the integral high refractive index region 230. The integral high refractive index region 230 may be located in the increased refractive index region 210 as shown, or connected to it or adjacent to it. As shown, the first optical guide 202 and second optical guide 204 each includes a core or central axis as represented by the dashed lines therein. In environment 200c, the core or central axis of the first optical guide 202 and second optical guide 204 are substantially aligned and aligned with the integral high refractive index region 230. Accordingly, the optical methods can include forming a block of the material of the optical interconnect 206 having a first refractive index, and modifying one or more regions (e.g., integral high refractive index region 230) of the block of the material to form a predefined area having a second refractive index different from the first refractive index. Also, the optical methods can include selecting the optical interconnect 206 to have a region (e.g., integral high refractive index region 230) with a higher refractive index compared to a remainder region (e.g., base refractive index region 208 and/or elastomeric material 209) having a base refractive index.

In some embodiments, the pressure-sensitive material of the optical interconnect 206 includes a composite material. The composite material can include an elastomeric material 209 and a rigid material (e.g., integral high refractive index region 230), wherein the rigid material has a higher elastic modulus than the elastomeric material 209, and the rigid material has a higher refractive index than the elastomeric material 209.

In some embodiments, an optical interconnect 206 can include a pressure-sensitive composite material having a first face (e.g., 206a) and a second face (e.g., 206b), the first and second faces being generally parallel through orthogonal with respect to each other. That is, the faces may be aligned and parallel, such as in a square or rectangular configuration, or at an angle such as in a rectangular or other shaped configuration, or with respect to adjacent sides of a square or rectangle. The pressure-sensitive composite material of the optical interconnect can include an elastomeric material 209 with a first refractive index, and a rigid material (e.g., integral high refractive index region 230) with a second refractive index that is different from the first refractive index. The rigid material can have a higher elastic modulus than the elastomeric material 209, the optical interconnect 106 being configured to form a waveguide region between a portion of the first face and a portion of the second face when pressure is applied between the portion of the first face and the portion of the second face, and the waveguide region arises from an increase in the volume proportion of the rigid material in the pressure-sensitive material located between the portion of the first face and the portion of the second face.

Figure 2B:
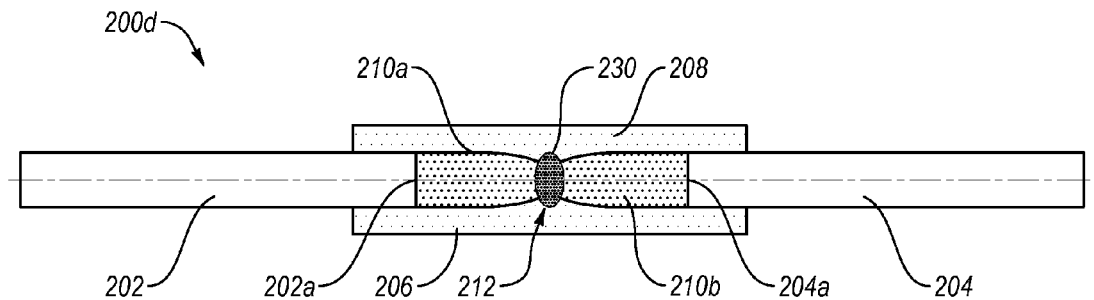
FIG. 2B illustrates an operating environment having aligned first and second optical guides sufficiently pressed into an optical interconnect with an integral high refractive index region so that the applied pressure forms an increased refractive index region in the optical interconnect adjacent to the integral high refractive index region between the aligned first and second optical guides.

FIG. 2B shows environment 200d having the first optical guide 202 with the first end 202a sufficiently pressed into the first side 206a so that the applied pressure forms a first increased refractive index region 210a on the first side 206a of the optical interconnect 206. Also, the second optical guide 204 having the second end 204a is sufficiently pressed into the second side 206b so that the applied pressure forms a second increased refractive index region 210b on the second side 206b. The increased refractive index regions 210a, 210b may be the same or different, but both have an increased refractive index compared to base refractive index region 208. The increased refractive index regions 210a, 210b may be the same or different as the integral high refractive index region 230. In environment 200d, the core or central axis of the first optical guide 202 and second optical guide 204 are substantially aligned and aligned with the integral high refractive index region 230. An increased refractive index junction 212 is between the increased refractive index regions 210a, 210b.

The pressures applied can form an increased refractive index junction 212 between the increased refractive index regions 210a, 210b. The increased refractive index junction 212 can be the same region, inclusive of, or different from the integral high refractive index region 230. As shown, the increased refractive index junction 212 is within the integral high refractive index region 230. The increased refractive index junction 212 and/or integral high refractive index region 230 can allow for an optical signal to be propagated between the increased refractive index regions 210a, 210b, and thereby allow for the optical signal to be propagated from the first optical guide 202 to the second optical guide 204. The increased refractive index junction 212 and/or integral high refractive index region 230 can include a refractive index that may be greater than, the same as, or less than the refractive index of one or more of the increased refractive index regions 210a, 210b, which allow for the propagation of the optical signal as described herein.

Figure 2C:
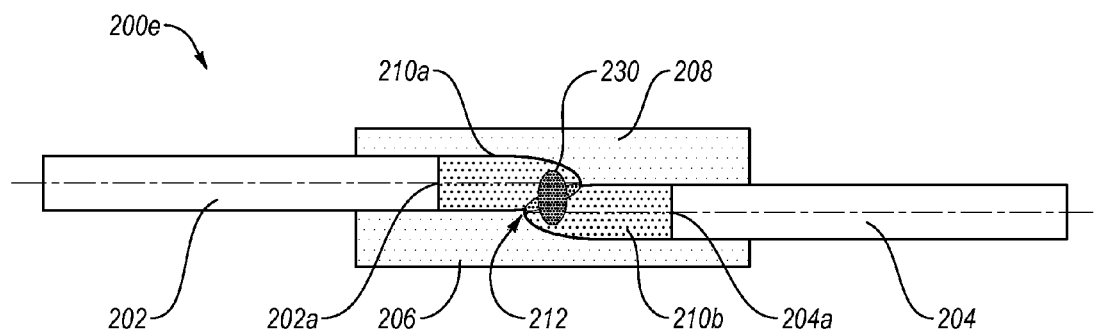
FIG. 2C illustrates an operating environment having offset first and second optical guides sufficiently pressed into an optical interconnect with an integral high refractive index region so that the applied pressure forms an increased refractive index region in the optical interconnect adjacent to the integral high refractive index region between the offset first and second optical guides.

FIG. 2C shows environment 200e having the first optical guide 202 with the first end 202a sufficiently pressed into the first side 206a so that the applied pressure forms a first increased refractive index region 210a on the first side 206a of the optical interconnect 206. Also, the second optical guide 204 having the second end 204a is sufficiently pressed into the second side 206b so that the applied pressure forms a second increased refractive index region 210b on the second side 206b. The increased refractive index regions 210a, 210b may be the same or different, but both have an increased refractive index compared to base refractive index region 208. The integral high refractive index region 230 is located between the increased refractive index regions 210a, 210b.

Figure 2D:
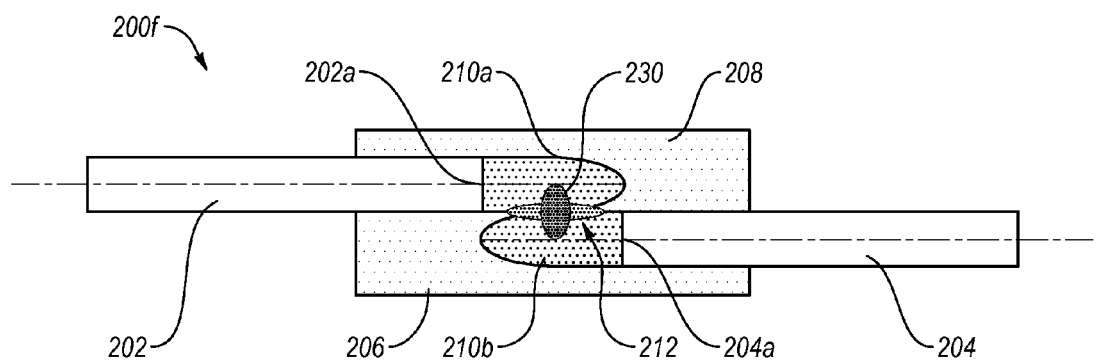
FIG. 2D illustrates an operating environment having completely offset first and second optical guides sufficiently pressed into an optical interconnect with an integral high refractive index region so that the applied pressure forms an increased refractive index region in the optical interconnect adjacent to the integral high refractive index region between the completely offset first and second optical guides.

In environment 200e, the core or central axis of the first optical guide 202 and second optical guide 204 are substantially unaligned or offset. However, the pressures applied can form an increased refractive index junction 212 between the increased refractive index regions 210a, 210b that bridge between offset of the unaligned central cores or central axes. The increased refractive index junction 212 can be the same region, inclusive of, or different from the integral high refractive index region 230. As shown, the increased refractive index junction 212 is within the integral high refractive index region 230. The increased refractive index junction 212 and/or integral high refractive index region 230 can allow for an optical signal to be propagated between the offset increased refractive index regions 210a, 210b, and thereby allow for the optical signal to be propagated from the first optical guide 202 to the second optical guide 204 even though they are substantially unaligned or offset. The increased refractive index junction 212 and/or integral high refractive index region 230 can include a refractive index that may be greater than, the same as, or less than the refractive index of one or more of the increased refractive index regions 210a, 210b, which allow for the propagation of the optical signal as described herein even though the increased refractive index regions 210a, 210b are substantially unaligned or offset. The integral high refractive index region 230 is located between the increased refractive index regions 210a, 210b so as to bridge therebetween. FIG. 2D shows environment 200f having the first optical guide 202 with the first end 202a sufficiently pressed into the first side 206a so that the applied pressure forms a first increased refractive index region 210a on the first side 206a of the optical interconnect 206. Also, the second optical guide 204 having the second end 204a is sufficiently pressed into the second side 206b so that the applied pressure forms a second increased refractive index region 210b on the second side 206b. The increased refractive index regions 210a, 210b may be the same or different, but both have an increased refractive index compared to base refractive index region 208. The integral high refractive index region 230 is located between the increased refractive index regions 210a, 210b so as to bridge therebetween.

In environment 100f, the core or central axis of the first optical guide 202 and second optical guide 204 are completely unaligned or offset. As shown, the sides of the first and second optical guides 202, 204 are so completely unaligned that the ends 202a, 204a of the first and second optical guides 202, 204 would not contact each other if further longitudinally pressed. However, the integral high refractive index region 230 spans to intersect both the first and second optical guides 202, 204. The pressures applied can form an increased refractive index junction 212 between the increased refractive index regions 210a, 210b that bridge between completely unaligned or offset central cores or central axes. The increased refractive index junction 212 is shown to intersect the integral high refractive index region 230, and may contain the integral high refractive index region 230. The increased refractive index junction 212 can effectively enlarge the volume of the integral high refractive index region 230. The increased refractive index junction 212 and/or integral high refractive index region 230 can allow for an optical signal to be propagated between the completely offset increased refractive index regions 210a, 210b, and thereby allow for the optical signal to be propagated from the first optical guide 202 to the second optical guide 204 even though they are completely unaligned or offset. The increased refractive index junction 212 and/or integral high refractive index region 230 can include a refractive index that may be greater than, the same as, or less than the refractive index of one or more of the increased refractive index regions 210a, 210b, which allow for the propagation of the optical signal as described herein even though the increased refractive index regions 210a, 210b are completely unaligned or offset.

In some embodiments, the optical methods can include increasing a volume proportion of the rigid material (e.g., integral high refractive index region 230) in the composite material from a first volume to a larger second volume in the pressure-sensitive material of the interconnect between the ends 202a, 204a of the first and second optical guides 202, 204. This increased volume proportion can be obtained by compressing the elastomer 209 to form a rigid material, which can have similar or the same optical and physical properties as the rigid material.

Figure 3:
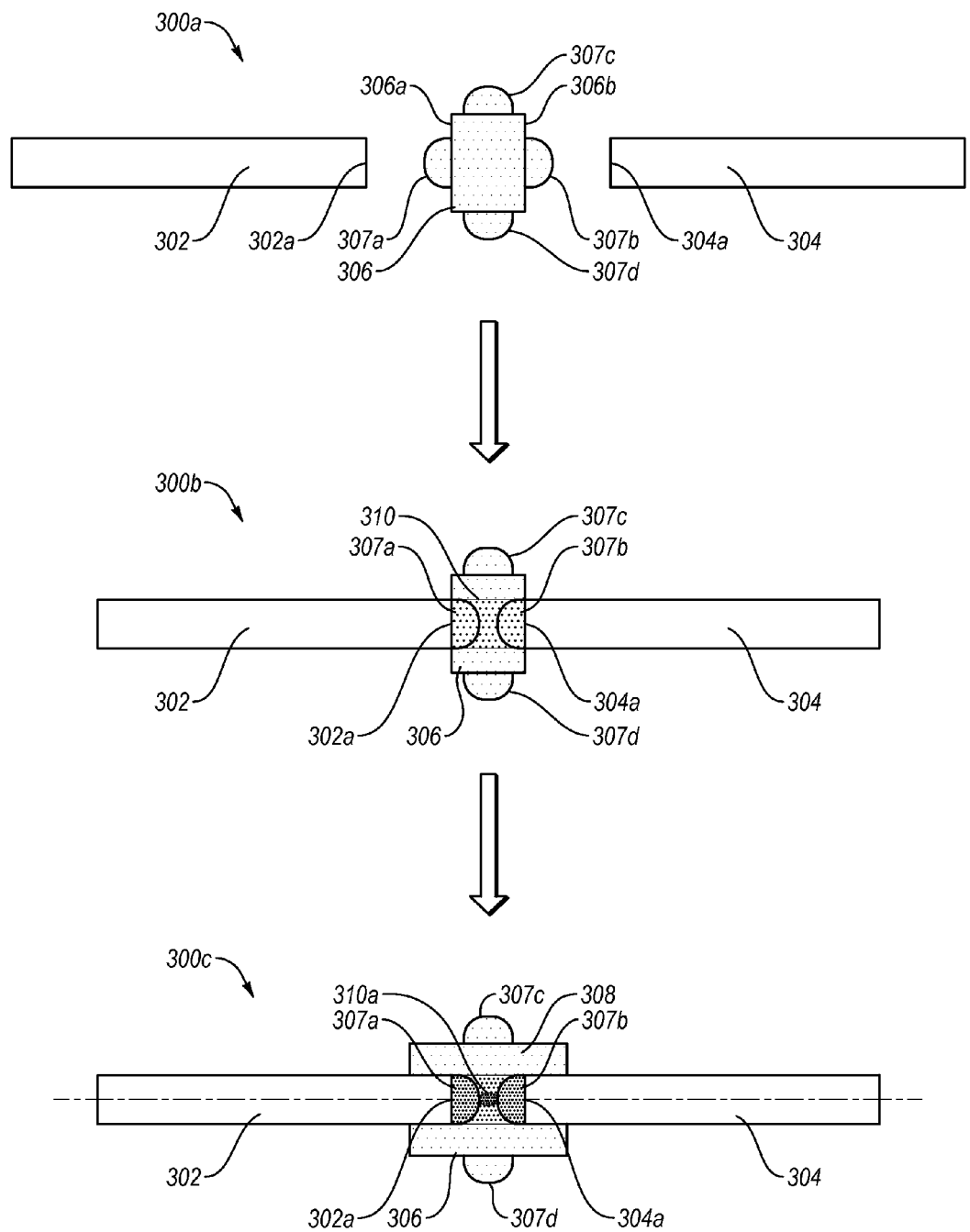
FIG. 3 illustrates an embodiment of a protocol for optically coupling a first optical guide with a second optical guide via an optical interconnect that has protrusions on optical guide-receiving surfaces.

FIG. 3 illustrates an embodiment of protocol for optically coupling a first optical guide 302 with a second optical guide 304 via an optical interconnect 306 that has protrusions 307a, 307b on opposing sides. Optionally, the optical interconnect 306 can also have protrusions 307c, 307d on sides orthogonal to the protrusions 307a, 307b. If a cube, each side may have a protrusion. As such, any two or more protrusions can be optically coupled by the optical interconnect 306. The protocol has environments 300a, 300b, and 300c. Environment 300a illustrates the first optical guide 302 having a first end 302a that is proximal to a first side 306a of the optical interconnect 306 that includes a first protrusion 307a, and the second optical guide 304 having a second end 304a proximal to a second side 306b of the pressure-sensitive optical interconnect 306 that has a second protrusion 307b. The pressure-sensitive optical interconnect 306 is also shown to have third protrusion 307c and fourth protrusion 307d.

Environment 300b illustrates the first optical guide 302 having the first end 302a being pressed into the first protrusion 307a of the first side 306a so as to apply pressure to the optical interconnect 306, and the second optical guide 304 having the second end 304a being pressed into the second protrusion 307b of the second side 306b so as to apply pressure to the optical interconnect 306. As the pressure is applied to the protrusions 307a, 307b of the optical interconnect 306, the pressure causes a change in the optical properties thereof, which can cause a change in the refractive index at an increased refractive index region 310. The increase in refractive index can be at the protrusions 307a, 307b and the increased refractive index region 310 therebetween. The protrusions 307a, 307b can be aligned to facilitate aligning of the first optical guide 302 with the second optical guide 304. As shown, the protrusions 307a, 307b are pressed to increase refractive index and to be pushed inside the optical interconnect 306. The change of the refractive index can be increased in the optical interconnect 306 and protrusions 307a, 307b by application of increased pressure from the first optical guide 302 and second optical guide 304.

Environment 300c illustrates the first optical guide 302 having the first end 302a sufficiently pressed into the first protrusion 307a of the first side 306a and the second optical guide 304 having the second end 304a sufficiently pressed into the second protrusion 307b of the second side 306b so that the applied pressure of the first optical guide 302 and second optical guide 304 into the optical interconnect 306 causes a significantly increased refractive index region 310a to be formed therein. The increased refractive index region 310a has an increased refractive index compared to base refractive index region 308. As shown, the first optical guide 302 and second optical guide 304 each includes a core or central axis as represented by the dashed lines therein. In environment 300c, the core or central axis of the first optical guide 302 and second optical guide 304 are substantially aligned. However, the core or central axis may not be aligned, and the protrusions 307a, 307b can facilitate the increase in refractive index as described herein so that the unaligned first and second optical guides 302, 304 can be optically coupled. In some embodiments, the optical aligning assembly 121 can include the optical interconnect that includes a first protrusion 307a aligned with the first opening 123 and a second protrusion 307b aligned with a second opening 125.

In some embodiments, the optical methods can include forming protruding regions (e.g., first and second protrusions 307a, 307b) of the pressure-sensitive material on the optical interconnect 306. The optical method can then include pressing the ends 302a, 304a of the first and second optical guides 302, 304 into the protruding regions (e.g., first and second protrusions 307a, 307b) of the optical interconnect 306. This can include pressing the first end 302a of the first optical guide 302 against the first protrusion 307a on the optical interconnect 306, and pressing the second end 304a of the second optical guide 304 against a second protrusion 307b of the optical interconnect 306. Also, the embodiments illustrated in FIGS. 1B-1D, and 2A-2D can include the pressure-sensitive optical interconnect 306 of FIG. 3 that has the protrusions 307a, 307b, and vice versa. As such, these embodiments may be combined and practiced together. While only single protrusions 307a, 307b are shown an each side, a plurality of such protrusions can be included on any side. The protrusion may be in columns, rows, grid, or array format.

Figure 4:
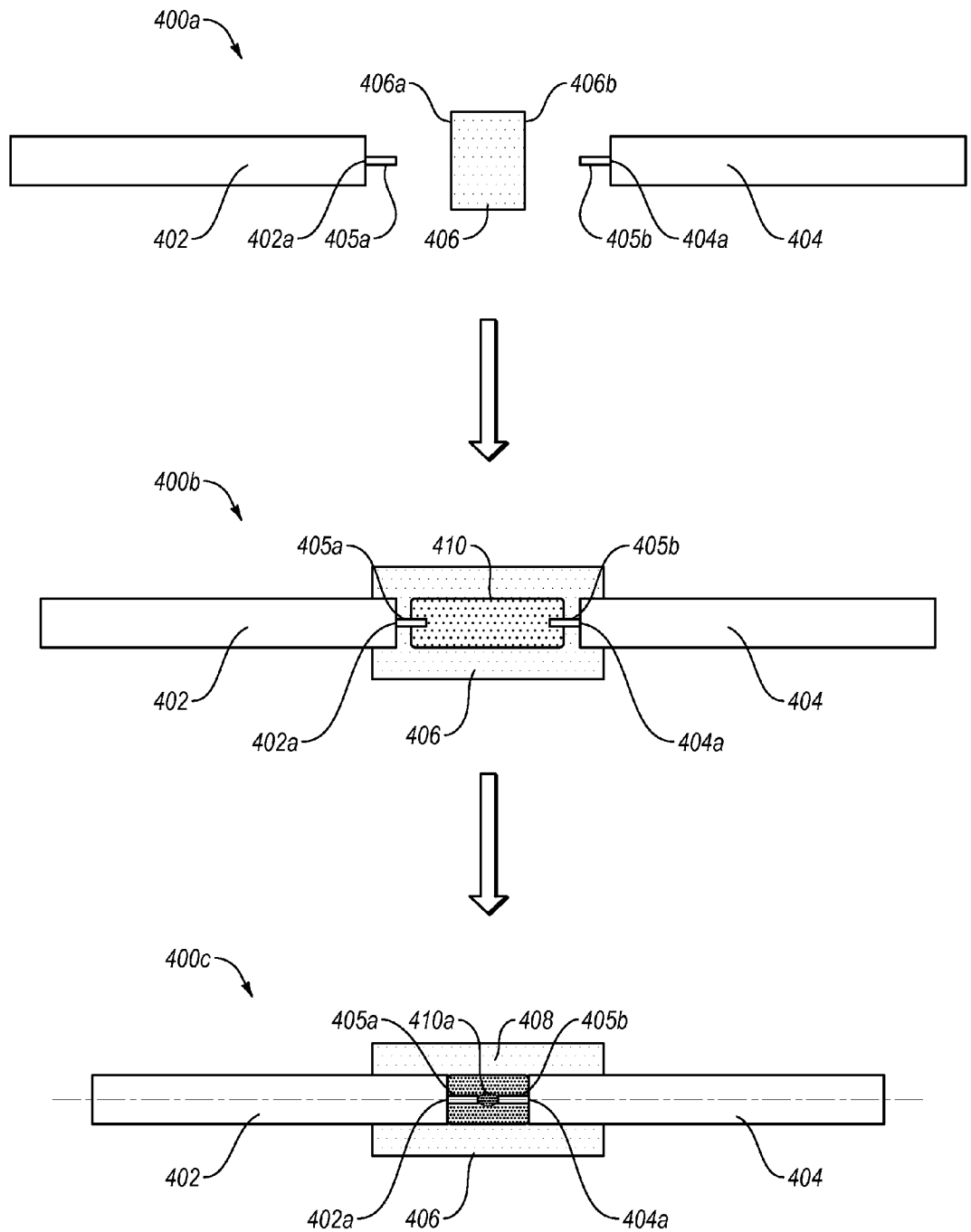
FIG. 4 illustrates an embodiment of a protocol for optically coupling a first optical guide with a core protrusion with a second optical guide with a core protrusion via an optical interconnect.

FIG. 4 illustrates an embodiment of protocol for optically coupling a first optical guide 402 with a second optical guide 404 via an optical interconnect 406, where the first optical guide 402 has a first core protrusion 405a on the first end 402a and the second optical guide 404 has a second core protrusion 405b on the second end 404a. Environment 400a illustrates the first optical guide 402 having a first end 402a with the first core protrusion 405a that is proximal to a first side 406a of the optical interconnect 406, and the second optical guide 404 having a second end 404a with the second core protrusion 405b that is proximal to a second side 406b of the optical interconnect 406. The protocol has environments 400a, 400b, and 400c.

Environment 400b illustrates the first optical guide 402 having the first end 402a with the first core protrusion 405a being pressed into the first side 406a so as to apply pressure to the optical interconnect 406, and the second optical guide 404 having the second end 404a with the second core protrusion 405b being pressed into the second side 406b so as to apply pressure to the optical interconnect 406. As the pressure is applied by the core protrusions 405a, 405b to the optical interconnect 406, the pressure causes a change in the optical properties thereof, which can cause a change in the refractive index at an increased refractive index region 410. The increase in refractive index can be adjacent to or in contact with the core protrusions 405a, 405b and the increased refractive index region 410 forms therebetween. As shown, the core protrusions 405a, 405b are pressed into the pressure-sensitive optical interconnect 406 so as to increase the refractive index of the optical interconnect 406.

Environment 400c illustrates the first optical guide 402 having the first end 402a with the first core protrusion 405a being significantly pressed into the first side 406a and the second optical guide 404 having the second end 404a with the second core protrusion 405b being sufficiently pressed into the second side 406b so that the applied pressure of the first optical guide 402 and second optical guide 404 into the optical interconnect 406 causes a significantly increased refractive index region 410a to be formed therein. The increased refractive index region 410a has an increased refractive index compared to base refractive index region 408. As shown, the first optical guide 402 and second optical guide 404 each includes core protrusions 405a, 405b or central axis as represented by the dashed lines therein. In environment 400c, the core protrusions 405a, 405b or central axis of the first optical guide 402 and second optical guide 404 are substantially aligned. However, the core protrusions 405a, 405b or central axis may not be aligned (e.g., offset or completely offset), and the core protrusions 405a, 405b can facilitate the increase in refractive index as described herein so that unaligned first and second optical guides 402, 404 can be optically coupled.

In some embodiments, the optical methods can include processing at least one of the ends 402a, 404a of the first and second optical guides 402, 404 to form a protruding core region (e.g., core protrusions 405a, 405b) thereon. Then the optical method can include pressing the protruding core region against the pressure-sensitive material of the optical interconnect 406. The optical methods can include pressing a first core protrusion 405a of the first end 402a of the first optical guide 402 against the optical interconnect 406, and pressing a second core protrusion 405b of the second end 404a of the second optical guide 404 against the optical interconnect 406. The optical methods can include forming an optical path between a first core protrusion 405a of the first optical guide 402 and a second core protrusion 405b of the second optical guide 404. The optical methods can include aligning a first core protrusion 405a of the first optical guide 402 with a second core protrusion 405b of the second optical guide 404.

In some embodiments, the optical methods may include intentional or unintentional misaligning of the first core protrusion 405a of the first optical guide 402 so as to be offset with the second core protrusion 405b of the second optical guide 404, and optically coupling the misaligned first core protrusion 405a of the first optical guide 402 with the second core protrusion 405b of the second optical guide 404 with the optical interconnect 406. This can include misaligning the first core protrusion 405a of the first optical guide 402 so as to be completely offset with the second core protrusion 405b of the second optical guide, and optically coupling the misaligned first core protrusion 405a of the first optical guide 402 with the second core protrusion 405b of the second optical guide 404 with the optical interconnect 406.

Also, the embodiments illustrated in FIGS. 1B-1D, 2A-2D, and 3 can be used with the optical guides 402, 404 that have core protrusions 405a, 405b, and vice versa. As such, these embodiments may be combined and practiced together.

Figure 5:
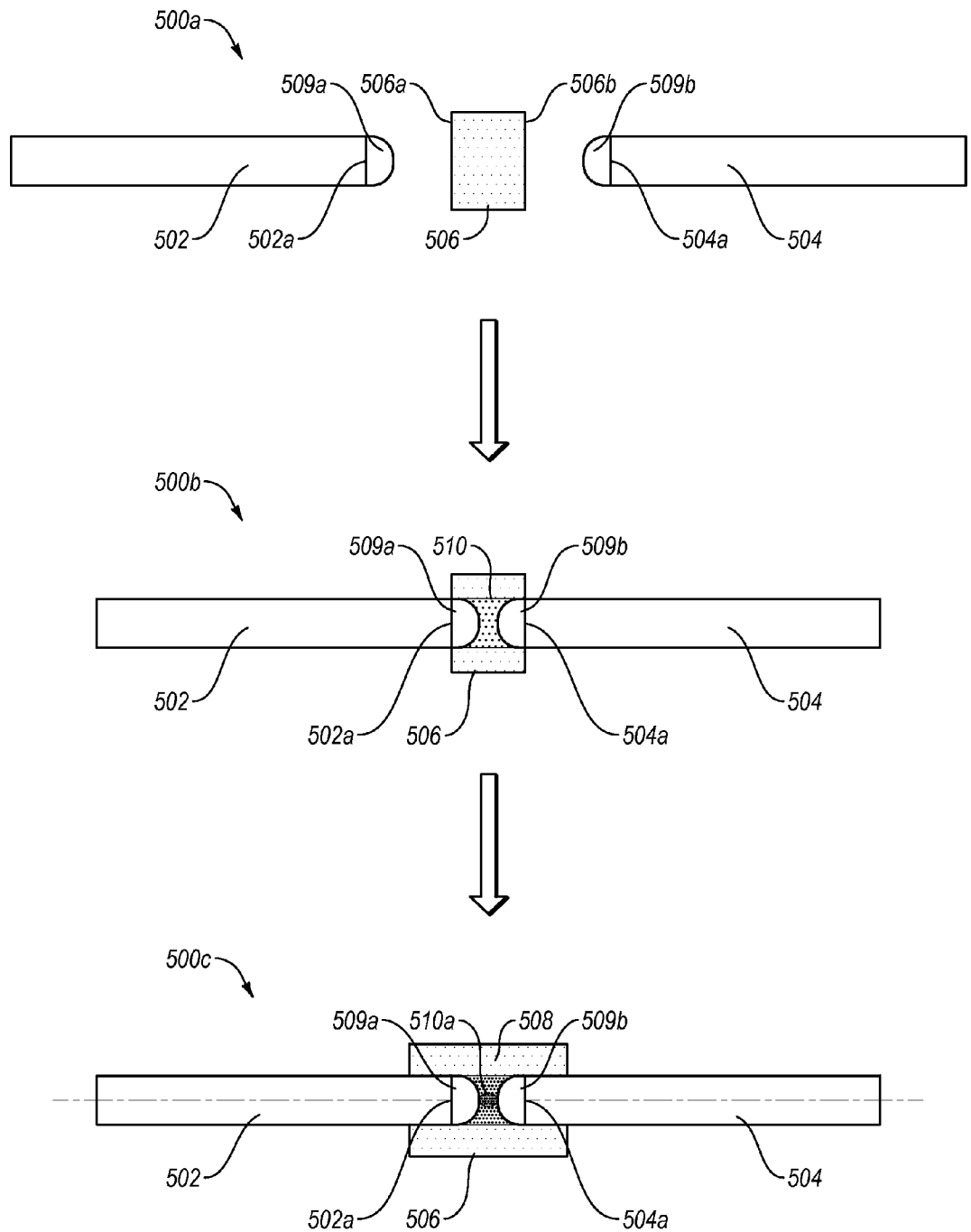
FIG. 5 illustrates an embodiment of a protocol for optically coupling a first optical guide with an end protrusion with a second optical guide with an end protrusion via an optical interconnect.

FIG. 5 illustrates an embodiment of protocol for optically coupling a first optical guide 502 with a second optical guide 504 via an optical interconnect 506, where the first optical guide 502 has a first protrusion 509a on a first end 502a and the second optical guide 504 has a second protrusion 509b on a second end 504a. Environment 500a illustrates the first optical guide 502 having a first end 502a with the first protrusion 509a that is proximal to a first side 506a of the optical interconnect 506, and the second optical guide 504 having a second end 504a with the second protrusion 509b that is proximal to a second side 506b of the optical interconnect 506. The protocol has environments 500a, 500b, and 500c.

Environment 500b illustrates the first optical guide 502 having the first end 502a with the first protrusion 509a being pressed into the first side 506a so as to apply pressure to the optical interconnect 506, and the second optical guide 504 having the second end 504a with the second protrusion 509b being pressed into the second side 506b so as to apply pressure to the optical interconnect 506. As the pressure is applied by the protrusions 507a, 507b to the optical interconnect 506, the pressure causes a change in the optical properties thereof, which can cause a change in the refractive index at an increased refractive index region 510. The increase in refractive index can be adjacent or in contact with the protrusions 509a, 509b and the increased refractive index region 510 forms therebetween. As shown, the protrusions 509a, 509b are pressed into the optical interconnect 506 so as to increase the refractive index of the optical interconnect 506.

Environment 500c illustrates the first optical guide 502 having the first end 502a with the first protrusion 509a being significantly pressed into the first side 506a and the second optical guide 504 having the second end 504a with the second protrusion 509b being sufficiently pressed into the second side 506b so that the applied pressure of the first optical guide 502 and second optical guide 504 into the optical interconnect 506 causes a significantly increased refractive index region 510a to be formed therein. The increased refractive index region 510a has an increased refractive index compared to base refractive index region 508. As shown, the first optical guide 502 and second optical guide 504 each includes a core or central axis as represented by the dashed lines therein. In environment 500c, the core or central axis of the first optical guide 502 and second optical guide 504 are substantially aligned. However, the core or central axis may not be aligned (e.g., offset or completely offset), and the protrusions 509a, 509b can facilitate the increase in refractive index as described herein so that unaligned first and second optical guides 502, 504 can be optically coupled.

In some embodiments, the optical methods can include pressing a first protrusion 509a of the first end 502a of the first optical guide 502 against the optical interconnect 506, and pressing a second protrusion 509b of the second end 504a of the second optical guide 504 against the optical interconnect 506.

Also, the embodiments illustrated in FIGS. 1B-1D, 2A-2D, 3, and 4 can be used with the optical guides 502, 504 that have protrusions 509a, 509b, and vice versa. As such, these embodiments may be combined and practiced together. While not shown, the embodiments described herein can use 1, 2, 3, 4, 5, or more separate pressure-sensitive optical couplers (i.e., optical interconnects) together so as to be longitudinally aligned. It is understood that illustration of a single optical interconnect may refer to a plurality of discrete optical interconnects that are longitudinally aligned. These pluralities of optical interconnects may have the same refractive index or changing refractive index properties, or different refractive index or changing refractive index properties from one or more of the other optical interconnects.

Additionally, the optical interconnects may have a recess on opposite sides that are dimensioned to receive the optical guides. For example, the environments of 100c-100b, 200c-200b, 400c, and 500c can be provided with the preformed recess (e.g., manufactured to have such preformed recess), and then the optical guides can be placed into the recess and pressure applied as described.

Figure 6:
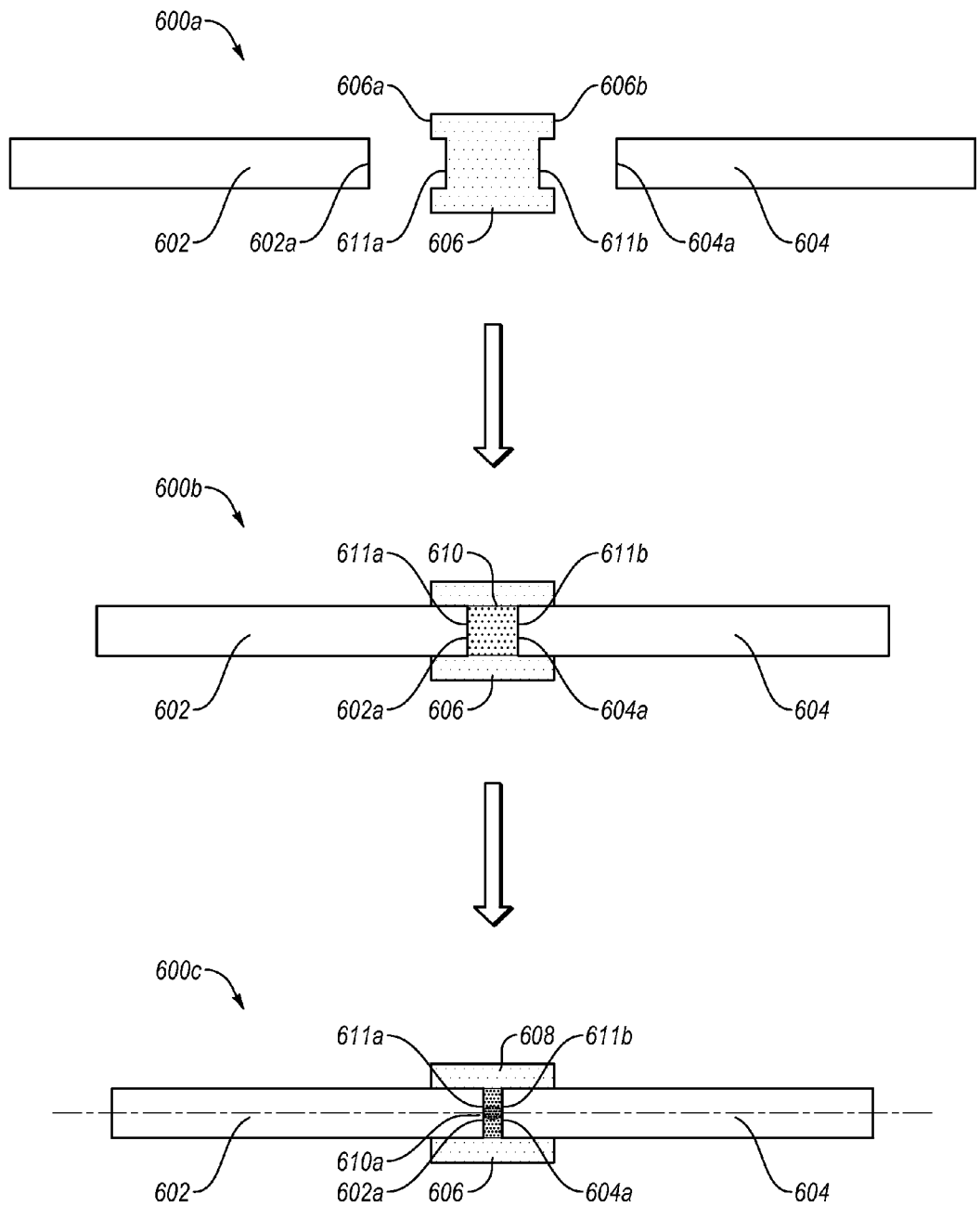
FIG. 6 illustrates an embodiment of a protocol for optically coupling a first optical guide with a second optical guide via an optical interconnect that has optical guide-receiving recesses.

FIG. 6 illustrates an embodiment of protocol for optically coupling a first optical guide 602 having a first end 602a with a second optical guide 604 having a second end 604a via an optical interconnect 606 that has recesses 611a, 611b on opposing sides 606a, 606b, respectively. The protocol can include environments 600a, 600b, and 600c. Optionally, the optical interconnect 606 can also have recesses on sides orthogonal to the recesses 611a, 611b (see FIG. 7A). If a cube, each side may have a recess. As such, any two or more recesses can be optically coupled by the optical interconnect 606. When two or more recesses are included, the optical interconnect 606 can operate as a beam splitter.

Environment 600a illustrates the first optical guide 602 having a first end 602a that is proximal to a first side 606a of the optical interconnect 606 that includes a first recess 611a, and the second optical guide 604 having a second end 604a proximal to a second side 606b of the optical interconnect 606 that has a second recess 611b.

Environment 600b illustrates the first optical guide 602 having the first end 602a being pressed into the first recess 611a of the first side 606a so as to apply pressure to the optical interconnect 606, and the second optical guide 604 having the second end 604a being pressed into the second recess 611b of the second side 606b so as to apply pressure to the optical interconnect 606. As the pressure is applied to the base of the recesses 611a, 611b of the optical interconnect 606, the pressure causes a change in the optical properties thereof, which can cause a change in the refractive index at an increased refractive index region 610. The increase in refractive index can be at the recesses 611a, 611b and the increased refractive index region 610 therebetween. The recesses 611a, 611b can be aligned to facilitate aligning of the first optical guide 602 with the second optical guide 604. As shown, the recesses 611a, 611b are further pressed into the optical interconnect 606 to increase refractive index. The change of the refractive index can be increased in the optical interconnect 606 and recesses 611a, 611b by application of increased pressure from the first optical guide 602 and second optical guide 604.

Environment 600c illustrates the first optical guide 602 having the first end 602a sufficiently pressed into the first recess 611a of the first side 606a and the second optical guide 604 having the second end 604a sufficiently pressed into the second recess 611b of the second side 606b so that the applied pressure of the first optical guide 602 and second optical guide 604 into the optical interconnect 606 causes a significantly increased refractive index region 610a to be formed therein. The increased refractive index region 610a has an increased refractive index compared to base refractive index region 608. As shown, the first optical guide 602 and second optical guide 604 each includes a core or central axis as represented by the dashed lines therein. In environment 600c, the core or central axis of the first optical guide 602 and second optical guide 604 are substantially aligned. However, the core or central axis may not be aligned (e.g., offset or completely offset), and the recesses 611a, 611b can facilitate the increase in refractive index as described herein so that the unaligned first and second optical guides 602, 604 can be optically coupled.

In some embodiments, the optical aligning assembly 121 can include the optical interconnect that includes a first recess 611a aligned with the first opening 123 and a second recess 611b aligned with a second opening 125.

In some embodiments, the optical methods can include forming recesses (e.g., first and second recesses 611a, 611b) in the pressure-sensitive material on the optical interconnect 606. The optical method can then include pressing the ends 602a, 604a of the first and second optical guides 602, 604 into the recesses 611a, 611b of the optical interconnect 606. This can include pressing the first end 602a of the first optical guide 602 against the first recess 611a on the optical interconnect 606, and pressing the second end 604a of the second optical guide 604 against a second recess 611b of the optical interconnect 606.

Also, the embodiments illustrated in FIGS. 1B-1D, 2A-2D, 5, and 6 can include the pressure-sensitive optical interconnect 606 of FIG. 6 that has the recesses 611a, 611b, and vice versa. As such, these embodiments may be combined and practiced together. While only single recesses 611a, 611b are shown on each side, a plurality of such recesses can be included on any side. The recesses may be in columns, rows, grid, or array format.

Figure 7A:
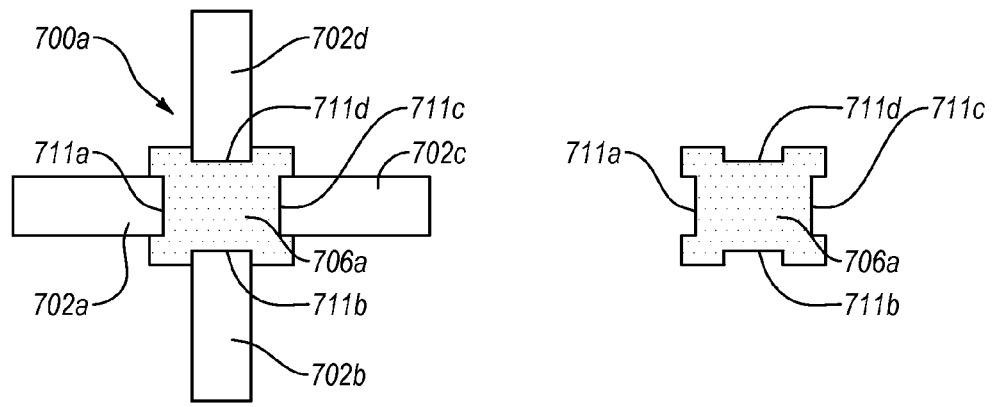
FIG. 7A illustrates an embodiment of a square optical interconnect that has optical guide-receiving recesses and an operating environment thereof.

FIG. 7A illustrates an embodiment of a cross-sectional profile of an optical interconnect 706a that includes a plurality of alignment features, which are illustrated as recesses 711a, 711b, 711c, 711d. However, the recesses may be substituted with flat surfaces, concave surfaces, convex surfaces, protrusions, or other alignment features. As shown in the operating environment 700a, two or more of the recesses 711a, 711b, 711c, 711d can receive optical guides (e.g., optical guides 702a, 702b, 702c, 702d). When three or more of the recesses 711a, 711b, 711c, 711d receive three or more optical guides 702a, 702b, 702c, 702d, the optical interconnect can be a beam splitter. For example, light may enter from one optical guide into the optical interconnect and exit therefrom through two or more other optical guides. When a cube, the optical interconnect can split an incoming beam into up to five outgoing beams. As such, more complex geometric shapes may similarly be used as beam splitters. Three-dimensional rectangles may also be used as beam splitters in accordance with the principles provided herein.

Figure 7B:
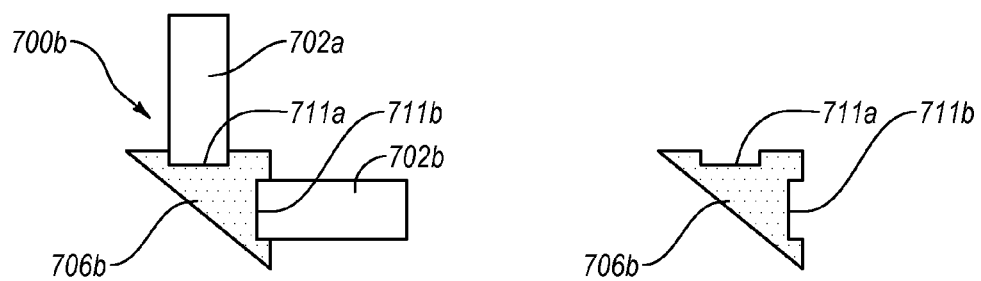
FIG. 7B illustrates an embodiment of a triangular optical interconnect that has optical guide-receiving recesses and an operating environment thereof.

FIG. 7B illustrates an example of a cross-sectional profile of an optical interconnect 706b in the shape of a three-dimensional rectangle (e.g., prism). The optical interconnect 706b includes recesses 711a, 711b that are substantially 90 degrees from each other. This illustrates the optical coupling and/or optical alignment can be at a significant angle, and thereby the angle of the optical guides 702a, 702b can be from 0 degrees to 180 degrees or any angle therebetween in the operating environment 700b.

Figure 7C:
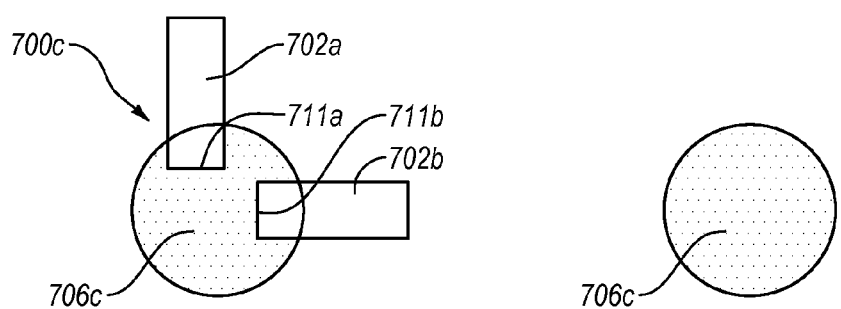
FIG. 7C illustrates an embodiment of a circular optical interconnect that has a continuous surface and an operating environment thereof.

FIG. 7C illustrates an example of a cross-sectional profile of an optical interconnect 706c in the shape of a sphere. The optical interconnect 706c does not include pre-formed recesses. As such, the optical guides 702a, 702b can be pressed into the continuous surface of the spherical optical interconnect 706c, where the optical guides 702a, 702b can be from 0 degrees to 180 degrees or any angle therebetween as shown in the operating environment 700c. Also, the spherical shape allows the optical interconnect 706c to receive three or more optical guides, and thereby can be used as a beam splitter. The pressing of the optical guides 702a, 702b can form recesses 711a, 711b, or the optical interconnect 706c can have the recesses 711a, 711b preformed.

In some embodiments, the optical methods can include positioning the ends of the first and second optical guides on different surfaces of the optical interconnect (see FIGS. 7A-7B). This can include the selecting the optical interconnect to have at least two different surfaces.

In some embodiments, the optical methods can include positioning the ends of the first and second optical guides on a continuous surface of the optical interconnect (see FIG. 7C). This can include selecting the optical interconnect to have one or more curved continuous surfaces, such as with a sphere.

FIG. 8A illustrates an example of a cross-sectional profile of a composite optical interconnect 806a that has a plurality of layers 840. One or more of the layers 840 can be layers of the pressure-sensitive material 840a, such as elastomer as used for the optical interconnects described herein. While not shown, in some aspects, all of the layers 840 may be the pressure-sensitive material 840a. In some aspects, one or more of the layers 840 can be layers of the pressure-sensitive material 840a and one or more layers 840 can be layers of the rigid material 840b. As shown, the layers 840 of the pressure-sensitive material 840a alternate with the layers 840 of the rigid material 840b.

In some embodiments, the composite optical interconnect 806a can include alternating layers of rigid materials 840b and pressure-sensitive materials 840a (e.g., elastomeric materials). When pressed, the layers 840 having the pressure-sensitive materials 840a thin to increase the local refractive index.

In some embodiments, the thicknesses of the layers 840 can vary, whether being prepared from rigid materials 840b or pressure-sensitive materials 840a. The thickness can be related to the wavelength of the light to be transmitted through the composite optical interconnect 806a, such as a factor of the wavelength of 1/x, where x is an integer. Examples of the integer can be 1, 2, 3, 4, 5, 6 or other integer. As such, the effective local refractive index of the optical interconnect 806a can be averaged over individual contributing components such as the layers 840 of rigid materials 840b and/or pressure-sensitive materials 840a.

FIG. 8B illustrates an example of a cross-sectional profile of a composite optical interconnect 806b that has a plurality of layers 840 having different properties, such as density, base refractive index, increased refractive index potential, or other characteristic. As shown, the plurality of layers 840 having different properties can be arranged in a gradient with the property having a maximum in the middle layer. This may enhance the refractive index in the middle layer 840. Other gradient distributions of layers 840 combinations can be utilized.

Figure 8C:
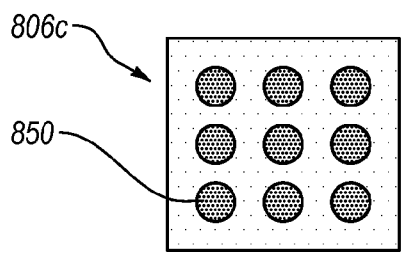
FIG. 8C illustrates an embodiment of a composite optical interconnect with ordered integral high refractive index regions.
Figure 8D:
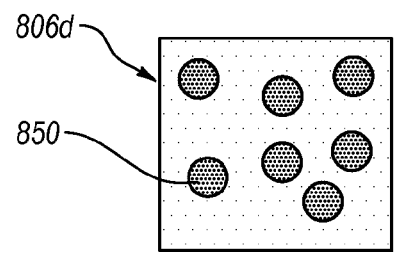
FIG. 8D illustrates an embodiment of a composite optical interconnect with disordered integral high refractive index regions.

FIG. 8C illustrates an example of a cross-sectional profile of a composite optical interconnect 806c that has a plurality of rigid members 850 distributed in the elastomeric and pressure-sensitive body. The rigid members 850 can be integral higher refractive index regions, and may be substantially more rigid than the elastomeric body. The rigid members may also have a higher refractive index compared to the elastomeric body. While FIG. 8C shows the rigid members 850 to be uniformly distributed in the composite optical interconnect 806c, FIG. 8D shows the composite optical interconnect 806d to have the rigid members 850 randomly distributed.

Figure 8E:
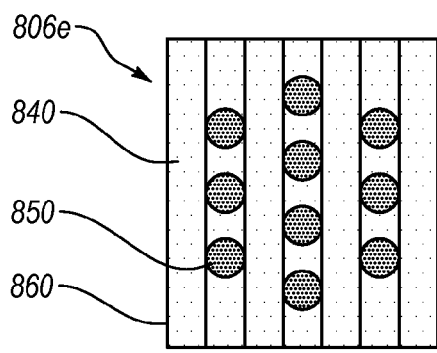
FIG. 8E illustrates an embodiment of a layered composite optical interconnect with some layers having staggered integral high refractive index regions.

FIG. 8E illustrates an example of a cross-sectional profile of a composite optical interconnect 806e that has a plurality of layers 840 having the rigid members 850. The rigid members 850 are staggered as illustrated from a first end 860 to a second end 862. This allows the ends of the optical guides to be received against the first and second ends 860, 862, and pressure to compress and thin the layers 840 so that the staggered rigid members 850 facilitate forming the optical path. However, other staggering configurations may be utilized.

Figure 8F:
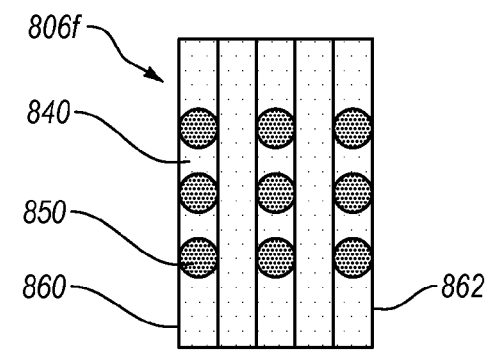
FIG. 8F illustrates an embodiment of a layered composite optical interconnect with layers having aligned integral high refractive index regions.

FIG. 8F illustrates an example of a cross-sectional profile of a composite optical interconnect 806f that has a plurality of layers 840 having the rigid members 850. The rigid members 850 are aligned as illustrated from a first end 860 to a second end 862. This allows the ends of the optical guides to be received against the first and second ends 860, 862, and pressure to compress and thin the layers 840 so that the aligned rigid members 850 facilitate forming the optical path from the first end 860 to the second end 862. However, other aligned rigid member 850 configurations may be utilized.

In some embodiments, the dimensions (e.g., thickness or diameter) of the rigid members 850 can vary. The dimensions can be related to the wavelength of the light to be transmitted through the composite optical interconnect 806c-f, such as a factor of the wavelength of 1/x, where x is an integer. Examples of the integer can be 1, 2, 3, 4, 5, 6 or other integer. As such, the effective local refractive index of the optical interconnect 806c-f can be averaged over individual contributing components such as the layers 840 and rigid members 850.

In some embodiments, the optical methods include selecting the pressure-sensitive material of the optical interconnect to include a composite material that has an elastomeric material and a rigid material (e.g., layer of rigid material 840b or rigid member 850), wherein the rigid material has a higher elastic modulus than the elastomeric material. The rigid material can be a layer (see FIG. 8A) or particle (see FIGS. 8C-8D). In some aspects, the optical methods can include selecting the composite material to include particles of the rigid material embedded in a matrix of the rigid material (see FIGS. 8C-8F).

In some embodiments, the optical methods can include selecting the composite material to include first layers of the elastomeric material interposed with second layers of the rigid material, wherein the first layers (e.g., pressure-sensitive material 840a) have lower elastic moduli than the second layers (e.g., rigid material 840b) as shown in FIG. 8A.

In some aspects, the optical methods can include applying a force to the composite optical interconnect with the ends of the first and second optical guides sufficient to change a thickness of one or more of the first layers to induce the change in the refractive index (see FIGS. 8A-8B and 8E-8F). The change in thickness can be a decrease in thickness, which can increase the refractive index.

The optical interconnects of FIGS. 7A-7C and 8A-8F can be utilized as described herein, such as in the embodiments illustrated in FIGS. 1B-1D, 2A-2D, 3, 4, 5, and 6 and vice versa. As such, these embodiments may be combined and practiced together.

The optical guide can be any waveguide, such as an optical fiber or rectangular waveguide. The optical guide may be considered to be an optical light guide that guides light through the material. The optical guide can be a physical structure that guides electromagnetic waves in the optical spectrum. The optical guide can be a single member or a plurality of members coupled or bunched together, which can be in an array, ribbon, or other combination. The optical guides can be one or more independent members with cladding around each member or one or more combinational members with cladding around the combinational members. Combinations of members may or may not have optical materials or light-sensitive materials (e.g., phosphorescent or fluorescent material) therebetween. The optical guide can be any shape, such as planar, strip, square, rectangular, oval circular, or combinations thereof. The optical guide can have any mode, such as single mode or multimode. The optical guides can have various refractive index distributions, such as constant, stepped, or gradient. The optical guides can be prepared from various materials, such as glass, polymer, semiconductor, or combinations thereof. While optical fibers are often used as the optical guides, other optical guides may include dielectric slab waveguides, two-dimensional waveguides, rib waveguide, segmented waveguide, photonic crystal waveguides, or any others, such as those subsequently developed.

The optical interconnect can be prepared from a variety of materials that can allow light to pass therethrough, and which can have regions with increased density and increased refractive index when subjected to pressure, which can be referred to as pressure-sensitive materials. The material of the optical interconnect can be formulated such that compression increases refractive index, which can be achieved by localized or regional increases in density under the compressive pressure. Elastomers are a class of pressure-sensitive materials that can be used for the optical interconnect. The elastomer can be used for the body of the optical interconnect that is in contact with the optical guides and that allows for the light to pass therethrough. Also, the elastomer material can be coated with other materials on the surfaces that do not receive the optical guides, which materials may be translucent through opaque and which materials may be rigid to elastomeric. The elastomer material can be configured to have a high starting refractive index and low Poisson's ratio.

The low Poisson's ratio can result in a low ratio of transverse-to-axial strain when the elastomer is compressed in one direction (e.g., longitudinally aligned with the optical guides) it does not expand orthogonally, radially, or laterally, but instead creates higher density regions. The low Poisson's ratio can be a low fraction of expansion divided by fraction of compression. Examples of the low Poisson's ratio can range from about 0 to about 0.5, which has no to small lateral expansion under longitudinal pressure. The materials of the optical coupling material can be modified in formulation and/or curing so as to reduce crosslinking density. Also, the materials may be selected with polymer chains that are capable of moving relative to each other in order to have the reduced Poisson's ratio.

The elastomeric optical coupling material can have a base refractive index of about 1.6 or from about 1.5 to about 1.7. The properties of the elastomeric optical interconnect can result in substantially an air gap between the optical guides and the body of the optical interconnect. Non-limiting examples of the elastomeric optical interconnect material can include silicones or organic silicones with refractive index of greater than or about 1.5, such as vinyl-terminated polyphenylmethylsiloxane (e.g., PMV-9925® of Gelest, Morrisville, Pa.) that has a nominal refractive index of 1.54, or silicone with a nominal refractive index of about 1.52 (e.g., CF2-4721® of NuSil, Carpinteria, Calif.), or polysilsesquioxanes (e.g., SST-3PP1® of Gelest, Morrisville, Pa.). Additionally, silicones can be compositionally modified to increase the starting refractive index by having increased phenyl content, which can be included by phenyl substituent chemical modification or crosslinking with phenyl groups. The elastomer materials may also include high refractive index nitriles, butadienes, polyurethanes, or others that have a refractive index of about 1.6 or from about 1.5 to about 1.7, such as polyacrylonitrile (e.g., 181315 Aldrich®, Sigma-Aldrich, Saint Louis, Mo.).

The optical interconnect can be manufactured by any method of manufacturing an elastomeric material. In a non-limiting example, the optical interconnect of FIGS. 1A-1D and 3-5 can be prepared by forming an elastomer into a sheet or block. The sheet or block can be further shaped into one or more individual optical interconnects with any feasible shape, where cylinders, spheres, prisms, blocks, conicals, frustoconicals, domes, combinations thereof, portions thereof, or the like for the cross-sectional shape and/or longitudinal shape. As such, the optical interconnect can have variable longitudinal thickness (e.g., thickness from contact surface to contact surface) which can be on the cm scale (e.g., about 0.1 to about 2 cm, about 0.5 to about 1.5 cm, about 0.25 to about 1.25 cm, or about 1 cm), millimeter scale (e.g., about 0.1 to about 10 mm, about 0.5 to about 5 mm, about 0.25 to about 2.5 mm, or about 1 mm), or micron scale (e.g., about 1 to about 100 µm, about 5 to about 75 µm, about 10 to about 50 µm, or about 20 to about 30 µm). The orthogonal, lateral, or radial dimensions can be the same or different (e.g., smaller or larger) from the longitudinal dimensions. The shape of the optical interconnect can be prepared by molding, blade cutting, stamping, or laser ablation. For example, the shaping can form the shape of FIG. 3. The shaped optical interconnect can then be fit into an optical assembly with optical guides in accordance with the embodiments and figures provided herein. In one example, a mechanical device can be prepared that includes a housing having the optical interconnect receiving and aligning the optical guides therein by pressure deformation. In one example, a bulk material can be cut into a plurality of the optical interconnects.

In a method of manufacture for the embodiment of the optical interconnect 206 a core body can be prepared from a higher refractive index material (e.g., integral high refractive index region 230) and a shell of relatively lower refractive index material (e.g., base refractive index region 208) can be prepared. The higher refractive index core can be placed into the lower refractive index shell. It should be noted that the lower refractive index shell is still a high refractive index material. The core may or may not be adhered to the shell, where such adhering may be with the same type of polymer for preparing either the core or shell, which can be added therebetween and cured. The pressure from the coupling of the optical guides can be sufficient to retain the core in the shell when not adhered together, in accordance with FIGS. 2A-2D.

In a method of manufacture for any of the embodiments of the optical interconnect, the material can be prepared as a liquid and then cured. The liquid may be cured in a mold to a desired shape or a general shape that is selectively shaped. The liquid may also be applied to an end of one or both optical guides and cured thereon. The liquid can be applied to an end of an optical guide by dipping, spraying, painting, or other application technique. The liquid applied to the end of the optical guide can be liquid elastomer or elastomer precursor that is later cured.

In a method of manufacture for any of the embodiments of the optical interconnect, the material of the optical interconnect (e.g., elastomer material) can be formed from a liquid precursor by curing, which can result in a cross-linking reaction. However, any method of making such a material can be used. The cross-linking chemistries to achieve curing can depend on the base polymer being cross-linked. Some examples of cross-linking chemistries can include: a peroxide-based chemistry in which cross-linking is heat-activated, e.g., by heating to 150 C; and additive chemistry where two liquid components (e.g., A and B) are mixed at a predetermined ratio for predetermined cross-linking; and additive chemistry with heat where the additive chemistry is conducted with heat. In one example, the additive chemistry can include one component being a catalyst and the other being a reactive polymer that can crosslink by the catalyst. Also, a vulcanization processes may be used for some elastomers.

In some embodiments, a method of manufacture can be implemented to produce the pressure-sensitive optical coupler 206 having the integral high refractive index region 230 of FIGS. 2A-2D. In some aspects, an integral high refractive index central zone can be created and then the base refractive index region 208 can be formed around the central zone. Also, the integral high refractive index region 230 can be induced by selective chemistry relative to the rest of the pressure-sensitive optical coupler 206. The selective chemistry can include: selective chemical reaction for targeted curing; and/or exposure to selective light for targeted curing. Also, the integral high refractive index region 230 can be formed by application of compressive or tensile strain during or after curing the liquid precursor into the elastomer material, where such forces can impart alterations in density that increase the refractive index relative to the rest of the material.

In some embodiments, a method of manufacture can be implemented to produce the pressure-sensitive optical coupler 206 having the integral high refractive index region 230 of FIGS. 2A-2D can be performed in the presence of one or both optical guides. The guides can be located within the liquid precursor, which is then cured around the optical guides. In some aspects, one or both of the optical guides can have other ends coupled to a light source that emits a light that facilitates curing of the liquid precursor. Such curing of the liquid precursor can preferentially occur between the optical guides, which can be performed to provide the increased refractive index therebetween. Also, such curing of the liquid precursor in the presence of both optical guides can allow for the optical guides to be better aligned before curing, or the curing can form the optical guides such as in environments 100d-100f and 200d-200f. This methodology has the advantage of automatically optically aligning the high index area to the core of the optical guides. In another method of manufacture, a sheet or block having a plurality of the integral high refractive index region 230 can be prepared, and then the sheet or block is cut so that each cut piece is an optical interconnect.

In another method of manufacture, local variations in cross-linking density can be achieved by methods including the localized application of heat, which can be by laser, photoinduced, or other light. Also, conductive heating elements and/or cooling can be applied to select regions during cross-linking in order to alter the cross-linking to facilitate local variations in refractive index.

In some embodiments, the embodiments of FIGS. 4 and 5 can be manufactured by selective processing of the optical guides. The core or central regions of the optical guides can protrude as cylinders (FIG. 4) or domes (FIG. 5) as illustrated. This allows for the compressed region in the optical interconnect to be more compressed at the core or central regions so that the density and refractive index are higher near the cores or central regions of the optical guides. The cylinder or dome protrusions can protrude by about 1 micron to about 1 cm, about 10 microns to about 100 mm, about 20 microns to about 1 mm, about 25 microns to about 500 microns. In one example, the cylinder or dome protrusion protrudes about 9 microns, which may or may not be the same or similar dimension as the diameter of the core or central region of the optical guide. The cylinder or dome protrusions can be obtained by chemical etching, grinding, flame heating, plasma heating, plasma etching, wet chemical etching, or other material removal process. In some aspects, only the cladding is removed to form the protrusion. In another aspect, the cladding and/or portions of the optical guide material are removed to form the protrusion. Also, cladding may be etched faster than the core material to result in the protrusion. These protrusions can be beneficial because the central region of the optical guide protrudes so that the portion of the optical guide member is more compressed to provide a higher density and higher refractive index compared to lateral or radial portions. Also, suitable profiles can be achieved by a wide range of processes, including flame heating, plasma heating, plasma etching, and wet chemical etching.

In some embodiments, the optical methods or methods of manufacture can include processing the pressure-sensitive material to substantially retain the change in the refractive index. This can include using light to further cure a liquid or partially cured material of the optical interconnect. This can be done before, during, or after the optical coupling and/or optical alignment.

The optical interconnects can be used in methods of manufacturing optical assemblies having optically coupled optical guides. The optical assemblies can be manufactured as new articles of manufacture. Also, the optical assemblies can be retrofit optical assemblies where a previous optical junction can be replaced and refabricated with the optical interconnect.

While the figures only illustrate a single optical guide, such optical guide can include a plurality of individual optical elements, such as individual optical fibers that are bound together in any bound format. As such, the optical coupling element can be used to optically couple a plurality of distinct, individual optical elements, whether bound together or arranged in an array other bundled format.

One skilled in the art will appreciate that, for these and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The invention claimed is:

1. A method of optically aligning optical guides, comprising:
positioning ends of first and second optical guides proximate a pressure-sensitive material, the first and second optical guides including at least one elongate optical guide; and
pressing the ends of the first and second optical guides against the pressure-sensitive material to induce a change in a refractive index of the pressure-sensitive material.

2. The method of claim 1, comprising urging the ends of the first and second optical guides against the pressure-sensitive material sufficient to increase the refractive index of the pressure-sensitive material.

3. The method of claim 1, comprising:
forming a first compressed region in the pressure-sensitive material with the first end of the first optical guide;
forming a second compressed region in the pressure-sensitive material with the second end of the second optical guide; and
forming an optical junction between the first compressed region and the second compressed region so as to be optically coupled.

4. The method of claim 3, comprising forming the optical junction as an intersection between the first compressed region that is offset from the second compressed region.

5. The method of claim 1, comprising:
selecting the pressure-sensitive material to include an elastomeric material that has a base refractive index; and
changing the refractive index of the elastomeric material to be higher than the base refractive index.

6. The method of claim 5, comprising:
pressing a first end of the first optical guide against a first surface of the pressure-sensitive material; and
pressing a second end of the second optical guide against a second surface of the pressure-sensitive material.

7. The method of claim 6, comprising narrowing a portion of the pressure-sensitive material between the first surface and the second surface from an initial dimension to a smaller dimension.

8. The method of claim 1, comprising selecting the pressure-sensitive material to include a composite material that has an elastomeric material and a rigid material internal of the elastomeric material, wherein the rigid material has a higher elastic modulus than the elastomeric material.

9. The method of claim 1, comprising applying a force to the pressure-sensitive material with the ends of the first and second optical guides sufficient to change a thickness of one or more of the first layers to induce the change in the refractive index.

10. The method of claim 1, comprising securing the ends of the first and second optical guides against the pressure-sensitive material sufficient to bias an applied pressure on the pressure-sensitive material with the ends of the first and second optical guides.

11. The method of claim 1, comprising processing the pressure-sensitive material to substantially retain the change in the refractive index.

12. The method of claim 1, comprising increasing the refractive index between the first and second optical guides sufficiently to substantially mitigate misalignment of the first and second optical guides.

13. The method of claim 1, comprising:
misaligning the first end of the first optical guide so as to be offset with the second end of the second optical guide; and
optically coupling the misaligned first end of the first optical guide with the second end of the second optical guide with the pressure-sensitive material.

14. The method of claim 1, comprising:
misaligning the first end of the first optical guide so as to be completely offset with the second end of the second optical guide; and
optically coupling the misaligned first end of the first optical guide with the second end of the second optical guide with the pressure-sensitive material.

15. A method of optically aligning optical guides, comprising:
positioning a first end of a first optical guide and a second end of a second optical guide in contact with an elastomeric material having a variable refractive index, the first and second optical guides including at least one elongate optical guide; and
inducing a change in a refractive index of a portion of the material sufficient to enable transmission of light from the first end of the first optical guide through the material to the second end of the second optical guide.

16. The method of claim 15, comprising applying one or more of a compressive force, a tensile force, and a shear force to surfaces of the material that induces the change in the refractive index.

17. The method of claim 15, comprising at least one of:
exposing the portion of the material to light having a wavelength that induces the change in the refractive index;
exposing the portion of the material to an electric or magnetic field that induces the change in the refractive index; or
chemically treating the portion of the material with a chemical reagent that induces the change in the refractive index.

18. The method of claim 15, further comprising positioning the first end of the first optical guide and the second end of the second optical guide to be in contact with different surfaces of the elastomeric material.

19. The method of claim 15, comprising positioning the first end of the first optical guide and the second end of the second optical guide to be in contact with a same continuous surface of the pressure-sensitive material.

20. The method of claim 15, comprising creating a refractive index gradient in elastomeric material.

21. An assembly to align optical guides, comprising:
a housing with a first opening and a second opening and a channel that extends between the first opening and the second opening, wherein the first opening is configured to receive a first end of a first optical guide and the second opening is configured to receive a second end of a second optical guide;
an optical interconnect with a pressure-responsive variable refractive index positioned within the channel, wherein the pressure-responsive variable refractive index is capable of varying upon application of pressure;
the first end of the first optical guide located in the first opening and biased against a surface of the optical interconnect; and
the second end of the second optical guide located in the second opening and biased against a surface of the optical interconnect.

22. The assembly of claim 21, comprising a fastener securing the ends of the first and second optical guides relative to the optical interconnect.

23. The assembly of claim 22, wherein the fastener maintains pressure of the first and second ends of the first and second optical guides against the optical interconnect.

24. The assembly of claim 21, wherein the optical interconnect is a pressure-sensitive elastomer.

25. The assembly of claim 21, wherein the housing comprises a resilient material that defines a first resilient channel at the first opening extending to the optical interconnect and defines a second resilient channel at the second opening extending to the optical interconnect such that the optical interconnect is positioned between the first resilient channel and the second resilient channel,
   wherein the first resilient channel is configured to guide the first optical guide to the optical interconnect and the second resilient channel is configured to guide the second optical guide to the optical interconnect.

* * * * *